United States Patent
Ogata et al.

(10) Patent No.: US 9,811,742 B2
(45) Date of Patent: Nov. 7, 2017

(54) VEHICLE-SURROUNDINGS RECOGNITION DEVICE

(71) Applicant: Clarion Co., Ltd., Saitama-shi, Saitama (JP)

(72) Inventors: Takehito Ogata, Tokyo (JP); Masahiro Kiyohara, Tokyo (JP); Kota Irie, Saitama (JP); Masao Sakata, Saitama (JP); Yoshitaka Uchida, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 2 days.

(21) Appl. No.: 15/107,143

(22) PCT Filed: Nov. 14, 2014

(86) PCT No.: PCT/JP2014/080182
§ 371 (c)(1),
(2) Date: Jun. 22, 2016

(87) PCT Pub. No.: WO2015/104898
PCT Pub. Date: Jul. 16, 2015

(65) Prior Publication Data
US 2016/0364619 A1 Dec. 15, 2016

(30) Foreign Application Priority Data
Jan. 9, 2014 (JP) ................. 2014-002549

(51) Int. Cl.
*G06K 9/00* (2006.01)
*G08G 1/16* (2006.01)
(Continued)

(52) U.S. Cl.
CPC ..... *G06K 9/00791* (2013.01); *G06K 9/00362* (2013.01); *G06K 9/00805* (2013.01);
(Continued)

(58) Field of Classification Search
CPC ........... G06K 9/00362; G06K 9/00791; G06K 9/00805; G06T 2207/30196;
(Continued)

(56) References Cited

U.S. PATENT DOCUMENTS

| 6,163,022 A | 12/2000 | Yasui et al. | |
| 2014/0225723 A1* | 8/2014 | Sobue | B60R 1/00 340/435 |

FOREIGN PATENT DOCUMENTS

| JP | 11-41521 A | 2/1999 |
| JP | 2011-65338 A | 3/2011 |

(Continued)

OTHER PUBLICATIONS

International Search Report (PCT/ISA/210) issued in PCT Application No. PCT/JP2014/080182 dated Feb. 3, 2015 with English translation (3 pages).

(Continued)

*Primary Examiner* — Siamak Harandi
(74) *Attorney, Agent, or Firm* — Crowell & Moring LLP

(57) ABSTRACT

Provided is a vehicle surroundings recognition apparatus capable of enhancing a calculation accuracy of a relative position and a relative speed with respect to an object such as a pedestrian even in a case where the object cannot be detected accurately in some of the images obtained by performing image-capturing around a vehicle, for example. In a case where a first state in which a first detection unit and a second detection unit detect first position information and second position information about an object and a second state in which only a second detection unit detects second position information about the object occur in a time sequence, first position information interpolation information for interpolating the first position information about the object in the second state is calculated on the basis of the first position information and the second position information in (Continued)

the first state and the second position information in the second state, and a relative distance and a relative speed to the object are measured on the basis of the first position information and the first position information interpolation information.

9 Claims, 17 Drawing Sheets

(51) Int. Cl.
*G06T 7/70* (2017.01)
*G06T 7/50* (2017.01)
(52) U.S. Cl.
CPC .................. *G06T 7/50* (2017.01); *G06T 7/70* (2017.01); *G08G 1/166* (2013.01); *G06T 2207/30196* (2013.01); *G06T 2207/30261* (2013.01)

(58) Field of Classification Search
CPC ... G06T 2207/30261; G06T 7/50; G06T 7/70; G08G 1/166
See application file for complete search history.

(56) References Cited

FOREIGN PATENT DOCUMENTS

| | | |
|---|---|---|
| JP | 2011-86163 A | 4/2011 |
| JP | 2013-69045 A | 4/2013 |

OTHER PUBLICATIONS

Japanese-language Written Opinion (PCT/ISA/237) issued in PCT Application No. PCT/JP2014/080182 dated Feb. 3, 2015 (4 pages).

* cited by examiner

| P2 | P3 | P4 |
|----|----|----|
| P1 | P0 | P5 |
| P8 | P7 | P6 |

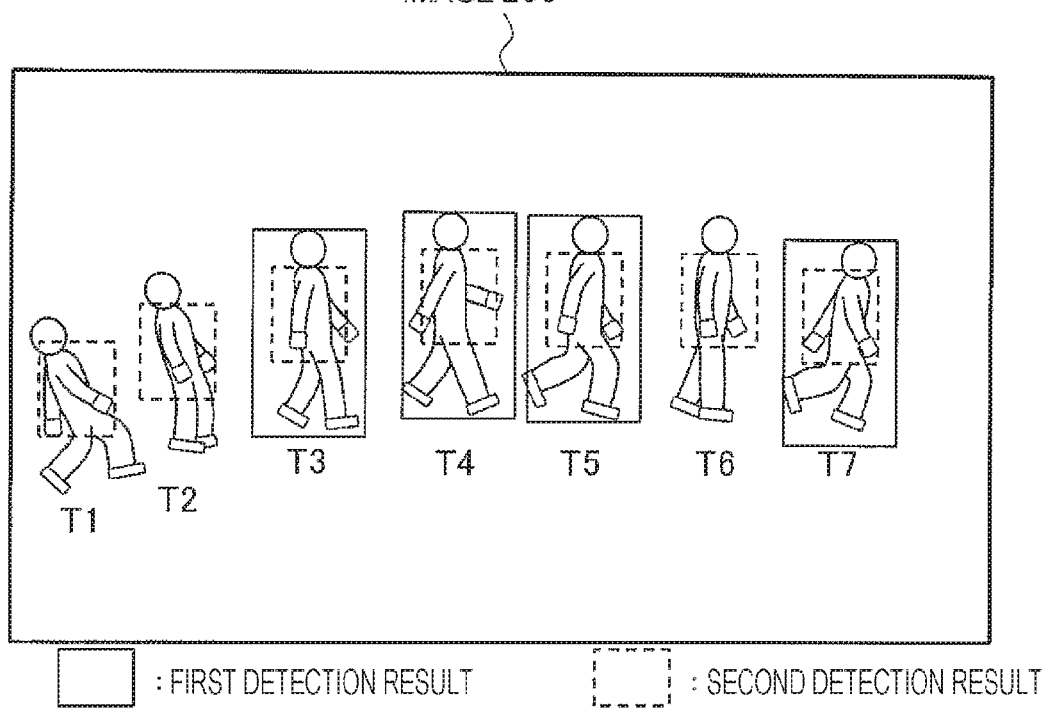

IMAGE 200

IMAGE 200

VEHICLE-SURROUNDINGS RECOGNITION DEVICE

TECHNICAL FIELD

The present invention relates to a vehicle surroundings recognition apparatus, and for example, to a vehicle surroundings recognition apparatus detecting a target object on the basis of information obtained from an image sensor such as a camera provided on a vehicle such as an automobile.

BACKGROUND ART

In the past, a system for controlling a vehicle by using information obtained from a sensor such as a camera and a sonar and supporting the driver of the vehicle has been developed. A pre-crash safety system and the like that attracts attention of the driver by giving a warning and the like when the vehicle may possibly collide with an obstacle in front of the vehicle and further alleviates injury to passengers by automatic breaking when the collision is inevitable has already been put into practice as an example of such system.

In such system, it is necessary to accurately find a relative position and a relative speed of a driver's vehicle and an obstacle in order to accurately determine the collision possibility between the driver's vehicle and the obstacle, and for example, PTL 1 discloses a technique for estimating the current position of the target object on the ground surface by tracking the target object to the immediate proximity of the driver's vehicle in a case where the ground contact position where the target object is in contact with the ground surface is out of the image-capturing range or blocked.

The target object tracking apparatus disclosed in PTL 1 includes target object detection means for predicting a current position of a target object on a ground surface on the basis of a position of the target object on the ground surface and vehicle motion information derived from an image in the past and detecting the target object from a position on a current image corresponding the detected current position on the ground surface, first position estimating means for estimating the current position of the target object on the ground surface on the basis of a ground contact position on the image and an attachment position of image-capturing means to a vehicle in a case where a ground contact position where the target object is in contact with the ground surface exists within an image-capturing range, second position estimating means estimating the current position of the target object on the ground surface on the basis of the position of the target object on the ground surface derived from the image in the past and an enlargement factor of a size of the target object in the current image with respect to a size of the target object in the image in the past, and unification means unifying the current position predicted by the target object detection means, the current position estimated by the first position estimating means, and the current position estimated by the second position estimating means.

According to the target object tracking apparatus disclosed in PTL 1, in a case where the ground contact position exists in the image-capturing range, the current position of the target object is estimated on the basis of the ground contact position, and even in a case where the ground contact position does not exist in the image-capturing range, the current position of the target object is estimated on the basis of the enlargement factor of the target object on the image, and therefore, even in a case where the ground contact position where the target object is in contact with the ground surface is out of the image-capturing range or blocked, the position of the target object can be estimated by tracking the target object to the immediate proximity of the vehicle.

CITATION LIST

Patent Literature

PTL 1: JP 2011-65338 A

SUMMARY OF INVENTION

Technical Problem

By the way, for example, in a case where a pedestrian who crosses the course of the driver's vehicle is detected by using a wide-angle camera used for a parking assistance and the like, the pedestrian that appears at the end of the visual field of the camera is difficult to be detected by performing a process of pattern matching because of lens distortion. For this reason, in a case where the pedestrian is detected with such process of pattern matching, the pedestrian is detected only after the pedestrian moving in the lateral direction comes to the center of the image where the camera distortion is small, and therefore, this delays the start of the calculation of the relative position with respect to the pedestrian and the relative speed. In general, it is known that the relative speed is calculated from the difference of the relative positions, and the smoothing processing for removing the noise is applied, and therefore, it takes a certain period of time to converge on the actual relative speed since the start of calculation of the relative positions. Therefore, under the circumstances explained above, the start of the calculation of the relative positions and the relative speed of the driver's vehicle and the pedestrian is delayed, and it takes a certain period of time for the calculated relative speed to converge on the actual relative speed, and there is a problem in that it cannot be accurately determine a possibility of collision with a pedestrian who crosses the course of the driver's vehicle.

A pedestrian who crosses the course of the driver's vehicle causes a great pattern change, and therefore, for example, it is difficult to stably make detection with a process of pattern matching, and the detection of the pedestrian performed with the process of pattern matching may be interrupted. In a case where the detection performed with the process of pattern matching is interrupted as described above, the calculation of the relative speed is started again after the pedestrian is detected again, and therefore, it takes some more time for the calculated relative speed to converge on the actual relative speed, and this makes it more difficult to accurately determine the chance of collision with the pedestrian who crosses the course of the driver's vehicle.

The present invention is made in view of such problems, and it is an object of the present invention to provide a vehicle surroundings recognition apparatus capable of enhancing the calculation accuracy of the relative position and the relative speed with an object even in a case where the object such as a pedestrian cannot be accurately detected in a part of an image obtained by performing image-capturing around the driver's vehicle, for example.

Solution to Problem

In order to solve the above problem, a vehicle surroundings recognition apparatus according to the present invention is a vehicle surroundings recognition apparatus recognizing a relative distance and/or a relative speed with respect to an object appearing in an image obtained by performing image-capturing around a vehicle, and the vehicle surroundings recognition apparatus includes a first detection unit detecting first position information about the object in the image, a second detection unit detecting second position information about the object in the image in accordance with a technique different from the first detection unit, a first detection position interpolation unit performing calculation of a first position information interpolation information for interpolating the first position information about the object in a second state on the basis of the first position information and the second position information in a first state and the second position information in the second state when the first state in which the first detection unit and the second detection unit detect the first position information and the second position information about the object and the second state in which only the second detection unit detects the second position information about the object occur in a time sequence, and a distance measurement unit measuring the relative distance and/or the relative speed with respect to the object on the basis of the first position information and the first position information interpolation information.

Advantageous Effects of Invention

According to the present invention, when a first state in which the first detection unit and the second detection unit detect the first position information and the second position information about the object from the image obtained by performing image-capturing around the vehicle and a second state in which only the second detection unit detects the second position information about the object from the image occur in a time sequence, the first position information interpolation information for interpolating the first position information about the object in the second state is calculated on the basis of the first position information and the second position information in the first state and the second position information in the second state, and the relative distance and/or the relative speed with respect to the object are measured by using the first position information interpolation information, so that, for example, in a case where the first detection unit cannot accurately detect the object such as the pedestrian in some of the images obtained by performing image-capturing around the vehicle, the relative position and the relative speed with respect to the object can be accurately calculated.

The problems, configurations, and the effects other than those that have been explained would become clear from the explanation about embodiments described below.

BRIEF DESCRIPTION OF DRAWINGS

FIG. 15A is a schematic diagram schematically illustrating an example of presence/absence of detection of the first detection unit and the second detection unit at a processing timing.

FIG. 15B is an explanatory diagram explaining an example of presence/absence of detection of the first detection unit and the second detection unit at the processing timing and a processing method with the distance measurement unit.

DESCRIPTION OF EMBODIMENTS

Hereinafter, an embodiment of a vehicle surroundings recognition apparatus according to the present invention will be explained with reference to drawings.

First Embodiment

Figure 1:
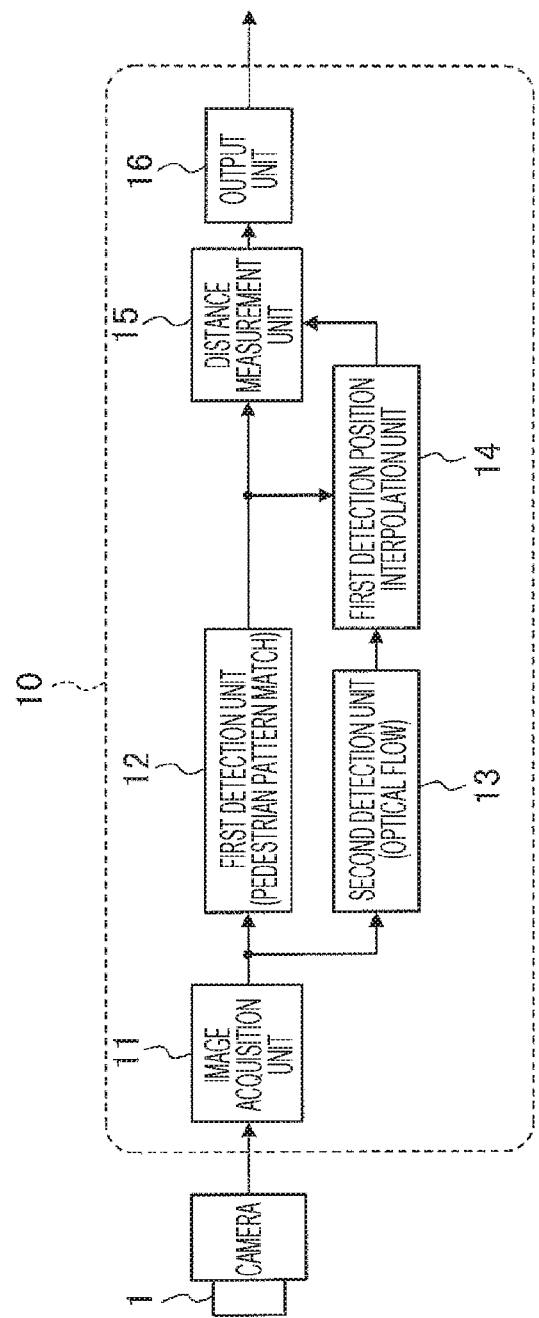
FIG. 1 is a block diagram illustrating an entire configuration of a first embodiment of a vehicle surroundings recognition apparatus according to the present invention.
Figure 2:
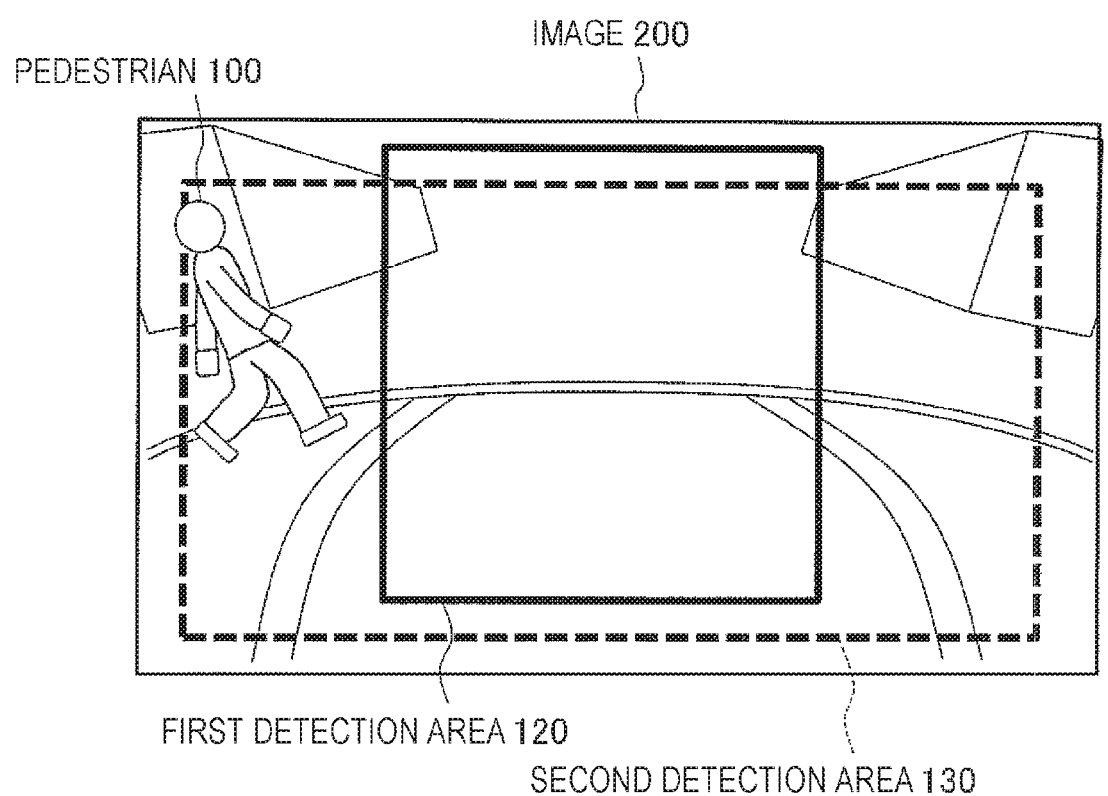
FIG. 2 is a schematic diagram schematically illustrating an image obtained by an image acquisition unit as illustrated in FIG. 1 and a first detection area and a second detection area which are set in the image.

First, the first embodiment of the vehicle surroundings recognition apparatus according to the present invention will be explained in details with reference to FIG. 1 to FIG. 16. FIG. 1 is a block diagram of a vehicle surroundings recognition apparatus 10 according to the first embodiment. FIG. 2 is a schematic diagram schematically illustrating an image obtained by an image acquisition unit as illustrated in FIG. 1 and a first detection area and a second detection area defined in the image.

The vehicle surroundings recognition apparatus 10 is incorporated into the inside of a camera apparatus provided on a vehicle such as an automobile or in the inside of a unification controller and the like, and the vehicle surroundings recognition apparatus 10 is configured to detect an object from an image captured by a camera 1 of the camera apparatus, and in the present embodiment, the vehicle surroundings recognition apparatus 10 is configured to detect, in particular, a pedestrian among the objects around the vehicle.

The vehicle surroundings recognition apparatus 10 is constituted by a computer having a CPU, a memory, an I/O, and the like, and is configured to be programmed for predetermined processing and execute processing repeatedly with a cycle T defined in advance.

As illustrated in FIG. 1, the vehicle surroundings recognition apparatus 10 includes an image acquisition unit 11, a first detection unit 12, a second detection unit 13, a first detection position interpolation unit 14, a distance measurement unit 15, and an output unit 16.

As illustrated in FIG. 2, the image acquisition unit 11 obtains an image 200 showing the surroundings of the vehicle captured by a camera 1 attached to a position where the surroundings of the vehicle can be captured, and stores the image 200 to the RAM. Internal parameters such as a lens distortion of the camera 1 and an external parameter such as an attachment position and an angle are obtained in advance by calibration that is performed when the vehicle is shipped. It should be noted that the image 200 is considered to be a two-dimensional array, and expressed as IMGSRC [x] [y]. In this case, each of x, y represents the coordinate of the image.

As illustrated in FIG. 2, the first detection unit 12 detects a pattern similar to a pedestrian from the first detection area 120 that is defined in the image 200 obtained by the image acquisition unit 11, and outputs a detection result D1 [n] thereof. This detection result D1 [n] is an array of a table having coordinates (SX, SY, EX, EY) on the image of the detected pedestrian as elements, and n denotes an ID in a case where multiple detections are made. The processing performed with this first detection unit 12 will be explained later in details.

As illustrated in FIG. 2, the second detection unit 13 detects a moving object having a motion different from the background from the second detection area 130 that is defined in the image 200 obtained by the image acquisition unit 11, and outputs a detection result D2 [m] thereof. This detection result D2 [m] is an array of a table having coordinates (SX, SY, EX, EY) on the image of the detected moving object as elements, and m denotes an ID in a case where multiple detections are made. The processing performed with this second detection unit 13 will be explained later in details.

For example, in a case where a pedestrian who crosses the course of the driver's vehicle is detected by using a wide-angle camera, a pedestrian 100 that appears at the end of the image 200 is difficult to be detected in a process of pattern matching because of lens distortion. Therefore, the first detection area 120 in the image 200 defined by the first detection unit 12 is smaller than the second detection area 130 in the image 200 defined by the second detection unit 13. More specifically, the first detection area 120 in the image 200 defined by the first detection unit 12 is set closer to the central area where the lens distortion is smaller than the second detection area 130 in the image 200 defined by the second detection unit 13.

The first detection position interpolation unit 14 calculates first position information interpolation information interpolating the detection result D1 [n] of the first detection unit 12 by using the detection result D2 [m] of the second detection unit 13. The processing performed with this first detection position interpolation unit 14 will be explained later in details.

The distance measurement unit 15 uses the detection result D1 [n] of the first detection unit 12 and the first position information interpolation information of the first detection position interpolation unit 14 to calculate the relative distance and the relative speed with respect to the pedestrian detected in the image 200, and outputs a measured distance result DR[n] thereof. This measured distance result DR[n] includes the relative position (PX, PY) and the relative speed (VX, VY) with respect to the detected pedestrian, and n is common to n in the detection result D1 [n] of the first detection unit 12. The processing performed with this distance measurement unit 15 will be explained later in details.

The output unit 16 outputs a measured distance result DR[n], which is output from the distance measurement unit 15, to an external device such as a controller, a warning apparatus, and the like of the vehicle provided outside of the vehicle surroundings recognition apparatus 10. It should be noted that the measured distance result DR[n] may be output in such a manner that the vehicle surroundings recognition apparatus 10 directly gives an input into the external device, or may be output by performing communication using the LAN (Local Area Network).

In the following explanation, the processing performed with the first detection unit 12, the second detection unit 13, the first detection position interpolation unit 14, and the distance measurement unit 15 explained above will be explained later in more details.

[First Detection Unit]

Figure 3:
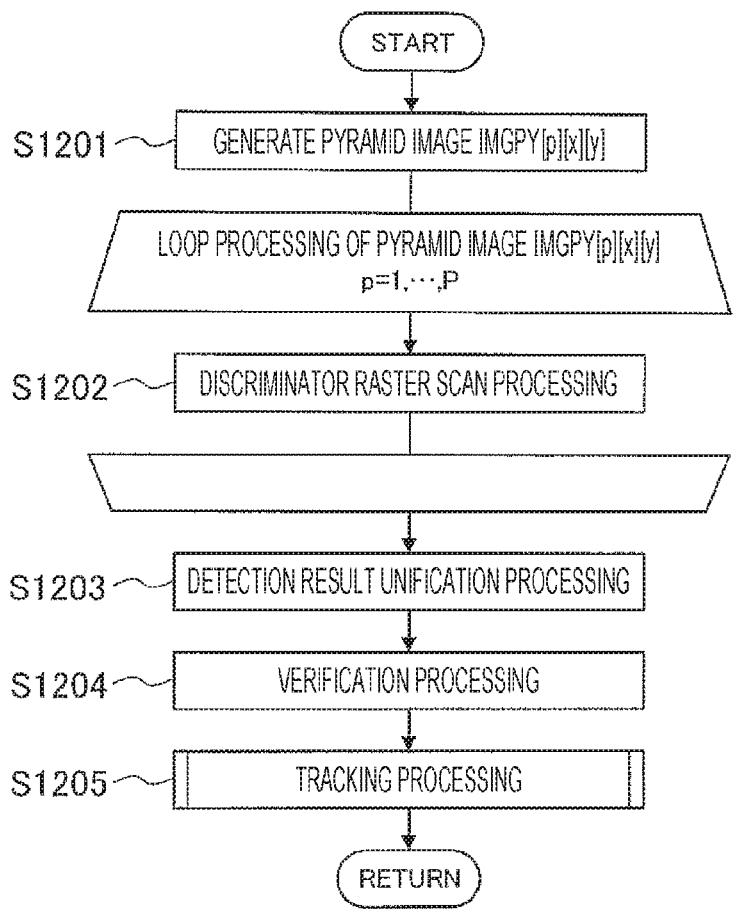
FIG. 3 is a flowchart explaining a processing flow of a first detection unit as illustrated in FIG. 1.

First, a processing content performed with the first detection unit 12 will be explained with reference to FIG. 3 to FIG. 8. FIG. 3 is a flowchart explaining a processing flow of the first detection unit 12.

First, in step S1201, the first detection unit 12 generates a pyramid image IMGPY [p] [x] [y] from an image in the first detection area 120 of an image IMGSRC [x] [y]. The pyramid image IMGPY [p] [x] [y] is an image group constituted by P images, and includes images obtained by reducing the image IMGSRC [x] [y] by predetermined rates in order. In the present embodiment, the pyramid image IMGPY [p] [x] [y] stores images obtained by reducing the image IMGSRC [x] [y] by a reduction rate 0.8, e.g., the image of the pyramid image IMGPY [p] [x] [y] at p=0 stores the same image as the image IMGSRC [x] [y], the image at p=1 stores an image obtained by reducing IMGPY [0] [x] [y] by the reduction rate 0.8, the image at p=2 stores an image obtained by reducing IMGPY [1] [x] [y] by the reduction rate 0.8.

In this case, distortion correction of the images may be performed on the basis of the camera parameters of the camera 1.

Figure 4A:
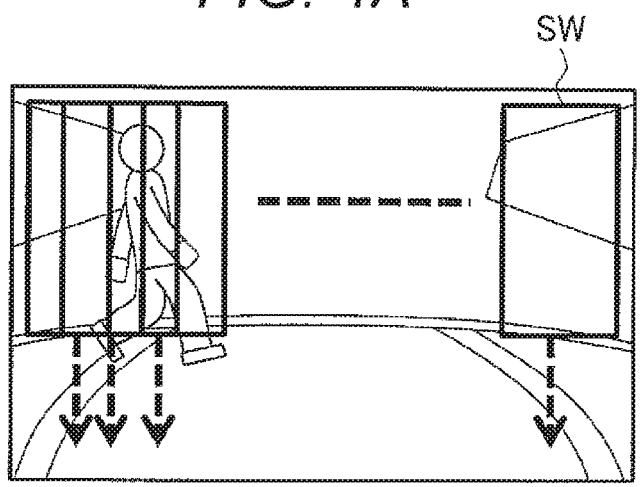
FIG. 4A is an explanatory diagram schematically explaining an example of raster scan processing.

Subsequently, processing is performed by repeatedly executing step S1202 from p=1 to p=P with regard to the pyramid image IMGPY [p] [x] [y]. In step S1202, raster scan processing is performed by using a discriminator on the pyramid image IMGPY [p] [x] [y]. As illustrated in FIG. 4A, the raster scan processing is processing for scanning the entire processing image by shifting a sub-window SW of a predetermined size within a processing image by a predetermined amount. In the present embodiment, the size of the sub-window SW is such that a width is 16 pixels and a height is 32 pixels. Then, pattern recognition processing is performed on the image in the sub-window SW at each position.

Hereinafter, processing using two types of pattern recognition techniques below will be explained as an example of pattern recognition processing performed on the image in the sub-window SW. Any pattern recognition technique may be used, but in the present embodiment, the second pattern recognition technique is assumed to be used.

Figure 4B:
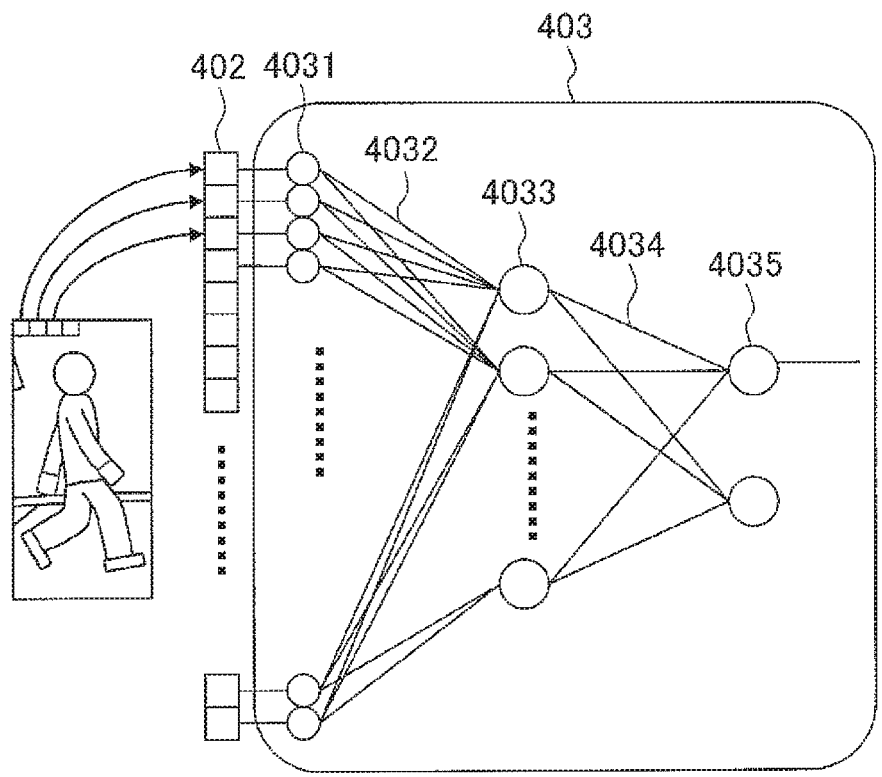
FIG. 4B is an explanatory diagram schematically explaining an example of pattern recognition processing.

The first pattern recognition technique is a method using neural network. More specifically, as illustrated in FIG. 4B, first, with regard to any given sub-window SW, an image in that area is cropped from the pyramid image IMGPY [p] [x] [y]. The cropped image may include only gray scale values or may include color information. In this case, a case of cropping only the gray scale value will be explained. Subsequently, one-dimensional vector 402 is generated by performing raster scan of the pixels in the cropped image, and the one-dimensional vector 402 is adopted as an input to the neural network 403. The neural network 403 simulates the network in the brain of a person, and include an input layer 4031, an intermediate layer 4033, and an output layer 4035 constituted by multiple nodes, and further, a weight coefficient 4032 exists between each node of the input layer 4031 and each node of the intermediate layer 4033, and a weight coefficient 4034 exists between each node of the intermediate layer 4033 and each node of the output layer 4035. The output of the neural network 403 is a single value of a node of the output layer, and this value is obtained by product sum calculation of the values of the nodes of all the intermediate layers 4033 connected to this node and a weight coefficient thereof. Further, the value of each node of the intermediate layer 4033 is obtained by product sum calculation of the values of the nodes of all the input layers 4031 connected to the node and a weight coefficient thereof.

In the pedestrian pattern detection, the one-dimensional vector 402 is simply connected to the input layer 4031, and therefore, the value of each node of the output layer 4035 is calculated by the above processing. As a result, when the value of a predetermined node of the output layer 4035 is more than a threshold value, it is determined that a pedestrian pattern exists. It should be noted that the predetermined node of the output layer 4035 is required to be determined in advance when a program is written, and the weight coefficients between the nodes are required to be adjusted in advance so that, in a case where a pedestrian pattern is input into the input node, the output of the node of the output layer 4035 is equal to or more than a threshold value, and in a case where a pattern other than a pedestrian is input, the output thereof is equal to or less than the threshold value. The adjustment method of the weight coefficients between the nodes may use a back propagation method which is a known technique.

Figure 5:
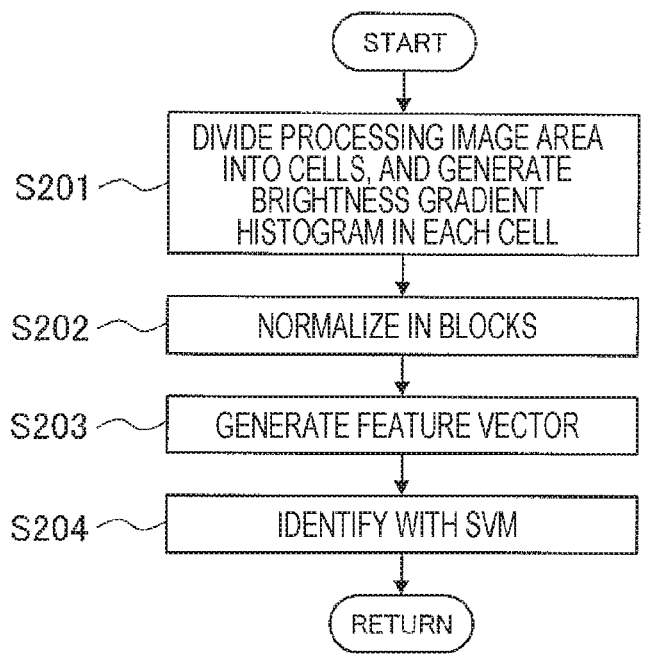
FIG. 5 is a flowchart explaining a processing flow of a pattern recognition technique in discriminator raster scan processing performed with the first detection unit as illustrated in FIG. 1.
Figures 6, 7:
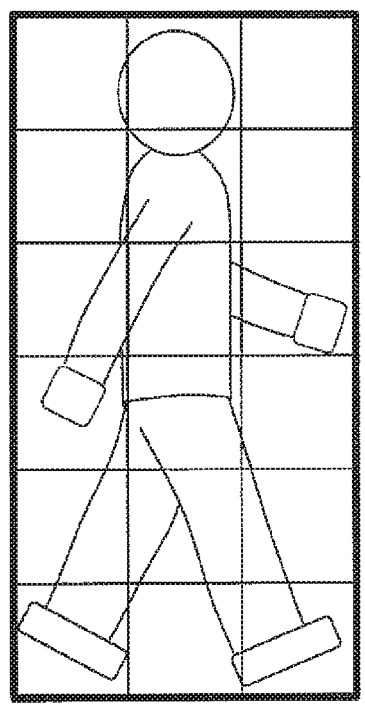
FIG. 6 is an explanatory diagram schematically illustrating a dividing method to cells in the pattern recognition technique as illustrated in FIG. 5.
FIG. 7 is an explanatory diagram explaining a pixel in question and surrounding pixels in voting processing in the pattern recognition technique as illustrated in FIG. 5.

The second pattern recognition technique is a method using brightness. In the present embodiment, a pattern recognition technique explained with reference to FIG. 5 to FIG. 7 is used. This recognition technique is an improved version of HOG (Histogram of Oriented Gradients) which is known as a technique effective for pedestrian detection. FIG. 5 is a flowchart explaining a processing flow of this pattern recognition technique, and FIG. 6 is an explanatory diagram schematically illustrating a dividing method into cells according to the pattern recognition technique as illustrated in FIG. 5.

First, in step S201, an image in any given sub-window SW is divided into small areas called cells (CELLs), and the brightness is calculated from the pixels which belong to each cell. More specifically, as illustrated in FIG. 6, the entire image area, in which the pattern recognition is performed, is divided into multiple cells. In the present embodiment, the processing image area is divided into three cells in the horizontal direction and six cells in the vertical direction.

Then, after the brightness is calculated from the pixels which belong to each cell, a histogram of brightness gradient is generated in each cell. The histogram of brightness gradient in the conventional HOG is made such that a histogram H [b] obtained by dividing 0 to 180 [deg] or 0 to 360 [deg] into a predetermined number (for example, dividing into 8) is prepared, and all of them are initialized to zero. Then, SOBEL filter and the like is applied to each pixel in the cell to derive brightness changes (dX, dY) in the X direction and the Y direction, and the intensity and the angle (G, θ) of the brightness change are calculated from the amount of change in the X direction and the Y direction, and the intensity G is voted for the position b of the histogram corresponding to the angle θ. A histogram H [b] obtained by carrying out this voting for all the pixels in the cell is the histogram of brightness gradient.

On the other hand, in the improved version of the HOG according to the present embodiment, the above voting processing is different from the conventional HOG. In this voting processing, two types will be explained with reference to FIG. 7.

First, with regard to the gradient direction of the histogram of brightness gradient, a case of considering only the direction, i.e., a case of considering in 0 to 180 [deg] will be explained. In this case, the histogram of brightness gradient is assumed to be divided into four, and is expressed as one-dimensional array from H [1] to H [4]. As illustrated in FIG. 7, reference symbols p0 (pixel in question) and p1 to p8 (surrounding pixel) are assigned to a pixel in a cell and eight close pixels around the pixel in question, and four values are calculated by using the following expression (1).

[Expression 1]

$$d15=|P1-P5|$$

$$d26=|P2-P6|$$

$$d37=|P3-P7|$$

$$d48=|P4-P8| \tag{1}$$

Then, d15 is voted for H [1] of the histogram of brightness gradient, d26 is voted for H [2], d37 is voted for H [3], and d48 is voted for H [4]. The above voting processing is carried out in all the pixels in the cell.

Subsequently, with regard to the gradient direction of the histogram of brightness gradient, the case of considering not only the direction but also the orientation, i.e., a case of considering in 0 to 360 [deg], will be explained. In this case, the histogram of brightness gradient is divided into eight, and is assumed to be expressed as one-dimensional array from H [1] to H [8]. Like the case explained above, as illustrated in FIG. 7, reference symbols p0 and p1 to p8 are assigned to a pixel in a cell and eight close pixels around the pixel in the cell, and eight values are calculated by using the following expression (2).

[Expression 2]

$$d1=\text{MAX}(0, p1-p0)$$

$$d2=\text{MAX}(0, p2-p0)$$

$$d3=\text{MAX}(0, p3-p0)$$

$$d4=\text{MAX}(0, p4-p0)$$

$$d5=\text{MAX}(0, p5-p0)$$

$$d6=\text{MAX}(0, p6-p0)$$

$$d7=\text{MAX}(0, p7-p0)$$

$$d8=\text{MAX}(0, p8-p0) \qquad (2)$$

Then, d1 is voted for H [1] of the histogram of brightness gradient, d2 is voted for H [2], d3 is voted for H [3], d4 is voted for H [4], d5 is voted for H [5], d6 is voted for H [6], d7 is voted for H [7], and d8 is voted for H [8]. The above voting processing is carried out in all the pixels in the cell.

Subsequently, as illustrated in FIG. 5, in step S202, for each block (BLOCK) constituted by multiple cells, the first detection unit 12 generates one-dimensional vector connecting the histogram of brightness gradient calculated in each cell, and normalizes the norm. For example, a block including two cells by two cells is formed, and the cell is defined so that a single cell extends over multiple blocks.

Subsequently, in step S203, a feature vector is generated by connecting the one-dimensional vector obtained by normalizing each block.

Subsequently, in step S204, a feature vector is input into an SVM (Support Vector Machine), and an evaluation value is obtained. The SVM is a known technique, and therefore, detailed explanation thereabout is omitted, but in order to perform identification by using the SVM, it is necessary for the SVM to perform learning by generating the feature quantity from image data of the pedestrian which is adopted as the detection target and a background other than the pedestrian in advance. The feature vector is expressed as a point in a space having dimensions (feature space), but in the learning of the SVM, a hyperplane of identification is generated in the middle of data (Support Vector) which is most significantly the border of the distribution of the pedestrian and the background in the learning data in the feature space. In the processing of this identification, when unknown data is input, an evaluation value is output in accordance with which of them it is closer to on the basis of the hyperplane. When this evaluation value is equal to or more than the threshold value, it is determined to be a pedestrian, and if not, it is determined to be a background.

As explained above, in the conventional calculation method, in the voting processing to each cell during the calculation of the feature quantity, the intensity and the angle (G, θ) of the brightness change are calculated from the brightness change (dX, dY) in the X direction and the Y direction, and the intensity G is voted for the position b of the histogram corresponding to the angle θ, and therefore, only a single voting can be given for a single pixel. On the other hand, according to the pattern recognition technique of the present embodiment explained above, four or eight voting opportunities can be obtained for a single pixel, and therefore, the density of the histogram of brightness gradient can be enhanced. In particular, a pedestrian who is present at a position away from the vehicle appears smaller on the image, and the resolution is low. Therefore, when a conventional calculation technique is applied, the number of pixels which belong to a single cell decreases, and the histogram of brightness gradient becomes sparse, and therefore, identification performance becomes too sensitive. On the other hand, according to the pattern recognition technique of the present embodiment explained above, the voting opportunity from a single pixel increases, and therefore, the density of the histogram of brightness gradient is improved, and the identification performance of the object can be improved.

In the technique explained above, in the voting to a single cell, the brightness difference is simply used as a voting value, but a threshold value TH may be defined for the brightness difference, and when the brightness difference is more than the threshold value TH, the voting value to the corresponding histogram of brightness gradient may be set to one, and when the brightness difference is equal to or less than the threshold value TH, the voting value to the corresponding histogram of brightness gradient may be set to zero. Alternatively, multiple threshold values TH1, TH2 (TH1<TH2) may be defined, and voting values may be set in multiple levels: when the brightness difference is less than the threshold value TH1, the voting value is set to zero, and when the brightness difference is equal to or more than the threshold value TH1 and less than the threshold value TH2, the voting value is set to one, and when the brightness difference is equal to or more than the threshold value TH2, the voting value is set to two.

The technique explained above is applied to the HOG feature quantity, but this technique can also be applied to other techniques based on the HOG by replacing the voting portion for a single cell with the technique explained above. Hereinafter, a flow of processing in a case of applying the technique to CoHOG which is one of known techniques based on the HOG will be explained.

First, like the HOG, a processing image is divided into multiple small areas.

Subsequently, the brightness differences of d1 to d8 in the expression (2) explained above are calculated with respect to the pixel in question in the small area. Then, when the brightness differences of d1 to d8 with respect to the pixel in question are more than the threshold value TH, one is stored to corresponding ba1 to ba8, and when the brightness differences of d1 to d8 with respect to the pixel in question are not more than the threshold value TH, zero is stored to corresponding ba1 to ba8.

Subsequently, likewise, at a reference pixel located at a predetermined distance from the pixel in question, the brightness differences of d1 to d8 of the expression (2) are calculated. Then, when the brightness differences of d1 to d8 with respect to the reference pixel are more than the threshold value TH, one is stored to corresponding bb1 to bb8, and when the brightness differences of d1 to d8 with respect to the reference pixel are not more than the threshold value TH, zero is stored to corresponding bb1 to bb8.

Subsequently, voting processing of a cooccurrence histogram is performed. The cooccurrence histogram is a two-dimensional histogram of eight by eight, and is expressed as a two-dimensional array from H [1] [1] to H [8] [8]. When both of ba1 of the pixel in question and bb1 of the reference pixel are one, one is voted for the element H [1] [1]. When any one of ba1 of the pixel in question and bb1 of the reference pixel is zero, voting is not cast. The above processing is performed totally 64 times on all the combinations of ba1 to ba8 of the pixels in question and bb1 to bb8 of the reference pixels.

Subsequently, while the pixel in question is not changed, the reference pixel is changed, and voting is cast on the cooccurrence histogram which is prepared for each reference pixel. The above processing is performed for the 30 reference pixels, and the voting processing is performed on the 30 cooccurrence histograms.

Further, a histogram having eight elements is prepared, and ba1 to ba8 of the reference pixels are voted for corresponding BIN of the histogram.

The above processing is performed on all the pixels in a small area. As a result, 30 cooccurrence histograms and one histogram are obtained from a single small area, and a feature quantity having (64×30+8) dimensions can be obtained. These feature quantities are calculated from all the small areas and made into vectors, which are adopted as feature vectors.

The identification processing on the feature vector uses SVM in the same manner as HOG, and therefore explanation thereabout is omitted.

Further, in the method expanded into the CoHOG explained above, multiple threshold values TH1, TH2 (TH1<TH2) may be defined, and voting values may be set in multiple levels: when the brightness difference is less than the threshold value TH1, the voting value is set to zero, and when the brightness difference is equal to or more than the threshold value TH1 and less than the threshold value TH2, the voting value is set to one, and when the brightness difference is equal to or more than the threshold value TH2, the voting value is set to two. In this case, ba1 to ba8 calculated from the brightness differences of d1 to d8 of the pixel in question and the threshold value TH1, TH2 have three values, i.e., 0, 1, 2, and likewise bb1 to bb8 of the reference pixels also have three values, i.e., 0, 1, 2. Therefore, the voting value to the cooccurrence histogram is a product thereof. For example, in a case where a conjugate of ba1 and bb1 is calculated, the voting value is ba1×bb1, and accordingly, any one of 0, 1, 2, 4 is voted.

As explained above, the feature quantity is calculated according to the method explained above with the CoHOG feature quantity, so that the voting opportunity from a single pixel can be increased, and the density of the cooccurrence histogram is improved, and the identification performance can be improved.

In the technique explained above, the brightness differences d1 to d8 are voted upon converted into 0, 1, or 2 by using the threshold value, but the brightness difference itself may be used for the voting.

In any of the expansion of HOG and the expansion of CoHOG explained above, d1 to d8 are calculated from eight close pixels around the pixel in question, and the histogram in eight directions is used this time, but, for example, similar processing may be performed on 21 close pixels at the outside of the eight close pixels.

The first detection unit 12 stores the detection result of the pedestrian obtained in the pattern recognition technique explained above to D1C [p] [q]. In this case, D1C represents a detection position coordinate (SX, SY, EX, EY) on the image. It should be noted that this detection position coordinate is converted into a coordinate on the image IMGSRC [x] [y] on the basis of a reduction rate used during generation of the pyramid image. The processing in step S1202 explained above is repeatedly performed from p=1 to p=P.

Subsequently, as illustrated in FIG. 3, in step S1203, the first detection unit 12 unifies the detection result of the raster scan processing. In this unification method, there are various known techniques, and therefore, detailed explanation thereabout is omitted here, but in the present embodiment, for example, a known technique called Mean Shift (mean shift method) is used. Then, the unification result thereof is stored to D1M [r]. In this case, D1M indicates detection position coordinates (SX, SY, EX, EY) on the image.

Subsequently, in step S1204, verification processing for the detected and unified result is performed. This verification processing is processing for excluding false recognition of a pattern similar to a pedestrian (for example, a telephone pole, a guard rail, and the like) that cannot be excluded in the pattern recognition processing. In this verification processing, there are various known techniques, and therefore, detailed explanation thereabout is omitted here, but in the present embodiment, for example, a method described in Japanese Patent Laid-Open No. 2011-154580 is considered to be used. As a result of this verification processing, in a case where a pattern is not determined to be a pedestrian, the pattern is deleted from D1M [r].

Subsequently, in step S1205, the tracking processing is performed, and D1M [r] determined to be a pedestrian in the verification processing and D1_Z1 [n] which is a result in the previous cycle are associated with each other.

Figure 8:
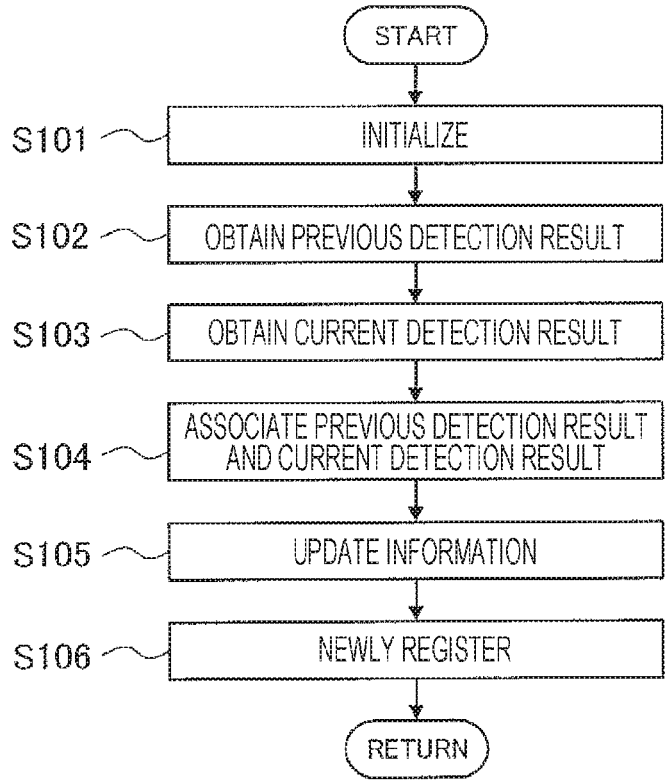
FIG. 8 is a flowchart explaining a tracking processing flow of the first detection unit as illustrated in FIG. 1.

FIG. 8 is a flowchart explaining a processing flow of the tracking explained above.

First, in step S101, the first detection unit 12 initializes the detection result D1 [n] of the current cycle. Subsequently, in step S102, a detection result D1_Z1 [n] of a previous cycle (previous cycle) is obtained, and in step S103, the detection result D1M [r] of this cycle is obtained.

Subsequently, in step S104, the detection result D1_Z1 [n] of the previous cycle and the detection result D1M [r] of the current cycle are associated with each other. In this association, a predetermined evaluation value is calculated by comparing, one by one, the areas (rectangular areas) of the detection result D1_Z1 [n] of the previous cycle and the detection result D1M [r] of this cycle, and when the evaluation value is equal to or more than a predetermined threshold value, the association is determined to be obtained, and when the evaluation value is equal to or less than the threshold value, the association is determined not to be obtained. In this case, in the evaluation value, there are various methods such as, for example, a method using a correlation value of the rectangular image itself and a method using a rectangular overlapping rate, but any one of the methods may be used. In the present embodiment, the prediction position D1_ZP[n] is calculated from the detection result D1_Z1 [n] of the previous cycle, and by using a rectangular overlapping rate OVR obtained from the prediction position D1_ZP [n] and the detection result D1M [r] of the current cycle, those having an overlapping rate OVR more than the threshold value are determined to be associated. It should be noted that the prediction position D1_ZP [n] is obtained as follows, a moving quantity is obtained from the detection result D1_Z1 [n] of the previous cycle and the detection result D1_Z2 [n] of a cycle two cycle before the current cycle, and the quantity is added to the detection result D1_Z1 [n] of the previous cycle. Where the rectangle of the prediction position D1_ZP [n] is (SXP, SYP, EXP, EYP), and the rectangle of the detection result D1M [r] of the current cycle is (SXM, SYM, EXM, EYM), the rectangular overlapping rate OVR is derived by calculating a common rectangle (SXC, SYC, EXC, EYC) from the following expression (3).

[Expression 3]

$SXC=MAX(SXP,SXM)$ $SYC=MAX(SYP,SYM)$ $EXC=MIN(EXP,EXM)$ $$EYC=\text{MIN}(EYP, EYM)$$

$$AP=(EXP-SXP)\times(EYP-SYP)$$

$$AM=(EXM-SXM)\times(EYM-SYM)$$

$$AC=(EXC-SXC)\times(EYC-SYC)$$

$$OVR=(2AC)/(AP+AM) \qquad (3)$$

Subsequently, in step S105, with regard to the prediction result D1_ZP [n] and the detection result D1M [r] of the current cycle that are associated with each other, the detection result D1M [r] of the current cycle is registered to the position where the object ID of the detection result D1 [n] of the current cycle is n.

Subsequently, in step S106, a result of the detection result D1M [r] of the current cycle that is not associated with the prediction result D1_ZP [n] is newly registered as a new detection object. This registration is performed by registering the detection result D1M [r] of the current cycle to the position of n where no information is registered in the detection result D1 [n] of the current cycle.

The tracking processing as described above is performed, so that the same ID is given until a once detected object (pedestrian) disappears, which improves the tracking performance of information. When a new object is registered, it is not registered to n where an object had existed until several cycles before, so that this prevents another object from being registered immediately after any given object disappears. As a result of this tracking processing, the pedestrian pattern detection result based on the process of pattern matching is output as first detection result (first position information) D1 [n].

[Second Detection Unit]

Figure 9:
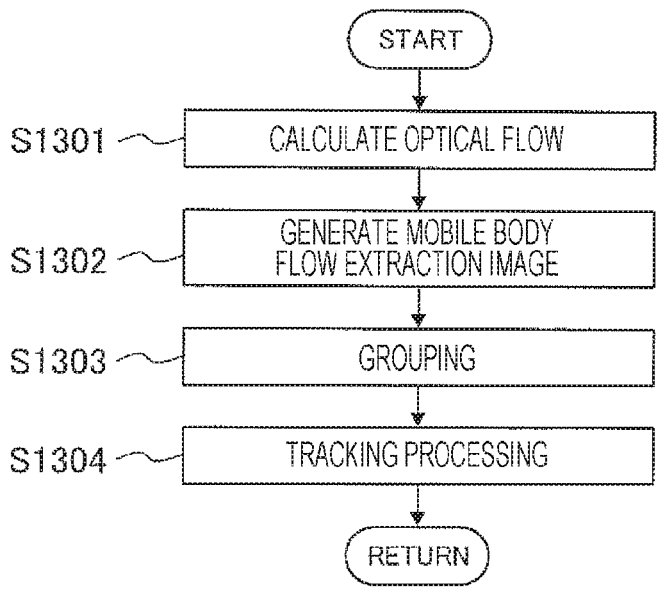
FIG. 9 is a flowchart explaining a processing flow of the second detection unit as illustrated in FIG. 1.

Subsequently, a processing content performed with the second detection unit 13 will be explained with reference to FIG. 9. FIG. 9 is a flowchart explaining a processing flow of the second detection unit 13.

First, in step S1301, the second detection unit 13 calculates an optical flow from the second detection area 130 of the image IMGSRC [x] [y] and the image IMGSRC_Z1 [x] [y] of the previous cycle. This optical flow is a vector indicating the point at any given coordinate (x, y) of one of the images has moved to which point in the other of the images, and an X direction component and a Y direction component are calculated for a single image coordinate (x, y). In the present embodiment, calculation is performed to determine which position (pixel) of the image IMGSRC_Z1 [x] [y] of the previous cycle each pixel of the image IMGSRC [x] [y] corresponds to.

Various calculation methods of the optical flow have been introduced, and any one of the calculation techniques may be used, but in the present embodiment, a block match method is considered to be used. The block match method is described in known documents about the image processing, and therefore, detailed explanation thereabout is omitted, but, for example, block match method a method in which a template image TP of a small area around a point (xn, yn) on the image IMGSRC [x] [y] is generated, and a position (xn', yn') where the template image TP best matches in the image IMGSRC_Z1 [x] [y] of the previous cycle is searched, and X direction component OFX[n]=(x1'-x1) and Y direction component OFY[n]=(yn'-yn) are calculated. It should be noted that the image compared with the image IMGSRC [x] [y] is not limited to the image IMGSRC_Z1 [x] [y] of the previous cycle, and may be an image of any given cycle in the past.

Subsequently, in step S1302, a moving object flow extraction image MVOBJ [x] [y] is generated from the optical flow.

More specifically, first, zeros are input into all of the moving object flow extraction image MVOBJ [x] [y] so that the moving object flow extraction image MVOBJ [x] [y] is initialized. Subsequently, the prediction flow is calculated by predicting at which position on the image of the previous cycle the position of the point (xn, yn) on the most recently retrieved image IMGSRC [x] [y] is located. In the present embodiment, if the driver's vehicle is considered to be driving straightly, the prediction flow thereof is as follows: first, from the vanishing point and the camera geometry, a world coordinate (Xn, Yn, 0) is derived by assuming that the coordinate (xn, yn) is a point of the ground surface, a moving quantity P=VSP×T is calculated from the vehicle speed VSP and the processing cycle T, and a prediction position (Xn, Yn+P, 0) is derived, and an image coordinate position (xnp, ynp) of the prediction position (Xn, Yn+P, 0) is calculated, and accordingly, the prediction flow is derived as PFX=(xnp-xn), PFY=(ynp-yn).

Subsequently, an error e between the prediction flow PFX, PFY and OFX[n], OFY[n] explained above is derived. In the present embodiment, the error e is a Euclid distance between flow vectors, and can be derived from the following expression (4).

[Expression 4]

$$e=(OFX[n]-PFX)^2+(OFY[n]-PFY)^2 \qquad (4)$$

Subsequently, the error e and the threshold value th are compared, and when the error e is more than the threshold value th, it is determined to be a moving object flow, and "1" is substituted into a moving object flow extraction image MVOBJ [xn] [yn]. The moving object flow extraction image MVOBJ [x] [y] is generated by performing the above processing on all the points in the second detection area 130.

Subsequently, in step S1303, the second detection unit 13 groups the moving object flow extraction image MVOBJ [x] [y]. In the present embodiment, this grouping is performed by applying the labeling processing on the moving object flow extraction image MVOBJ [x] [y]. A result of the labeling processing is registered as rectangle information (SX, SY, EX, EY) to the detection result D2M [m] of the second detection unit 13 as a moving object detection result.

Subsequently, in step S1304, tracking processing is performed. This tracking processing is the same as the processing content of the first detection unit 12 explained with reference to FIG. 8, and therefore, the detailed explanation thereabout is omitted here. As a result of this tracking processing, the moving object detection result based on the optical flow is output as a second detection result (second position information) D2 [m].

In the above embodiment, only a single moving object flow extraction image MVOBJ [x] [y] is used, but, for example, multiple moving object flow extraction images MVOBJ [x] [y] may be prepared depending on the moving directions.

In the above explanation, the driver's vehicle is assumed to be driving straightly, but, for example, dead reckoning method may be used, and the speeds in the longitudinal direction, the lateral direction, and the turning direction of the driver's vehicle may be derived from the right and left wheel speed values to be used for the prediction.

[First Detection Position Interpolation Unit]

Figure 10:
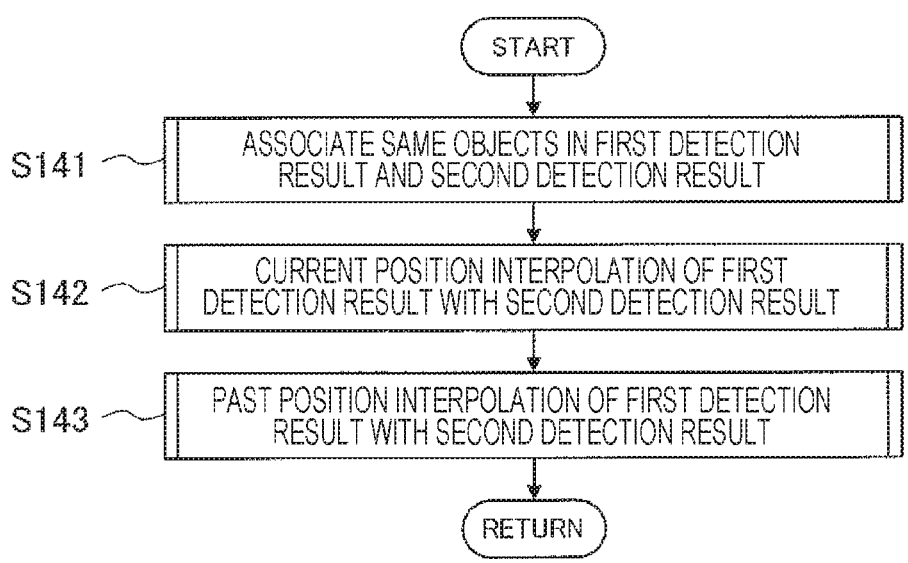
FIG. 10 is a flowchart explaining a processing flow of a first detection position interpolation unit as illustrated in FIG. 1.

Subsequently, the processing content performed with the first detection position interpolation unit 14 will be explained with reference to FIG. 10 to FIG. 13. FIG. 10 is a flowchart explaining a processing flow of the first detection position interpolation unit 14.

Figure 11:
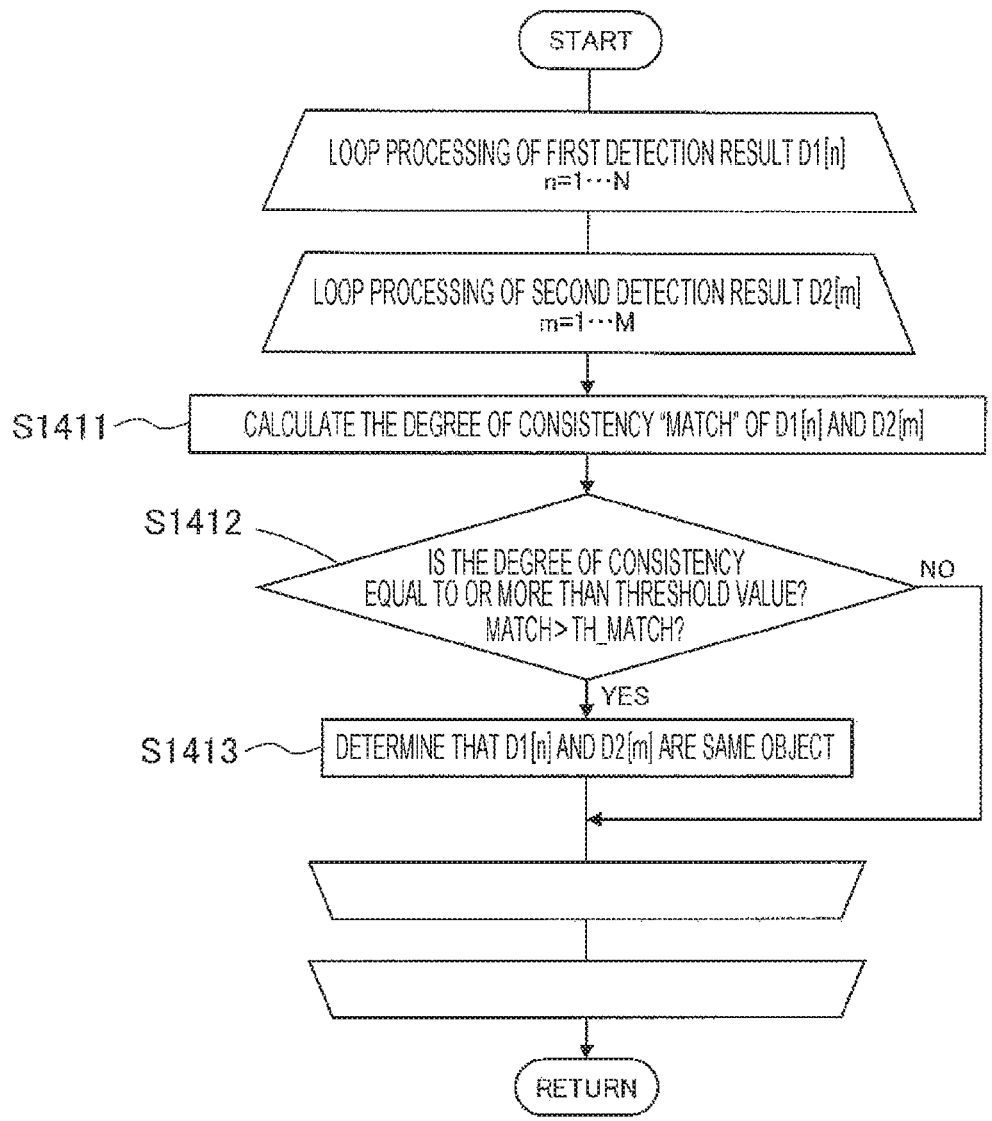
FIG. 11 is a flowchart explaining a processing flow of identical object association processing as illustrated in FIG. 10.

First, in step S141, the first detection position interpolation unit 14 performs identical object association of the first detection result D1 [n] which is output from the first detection unit 12 and the second detection result D2 [m] which is output from the second detection unit 13. FIG. 11 is a flowchart explaining a processing flow of this identical object association processing.

First, with regard to the first detection result D1 [n], the processing is repeatedly performed from n=1 to N. In this case, as a result of the tracking processing, the first detection result D1 [n] includes a portion where information is lost, and therefore, the processing is performed on entire allocated area of the first detection result D1 [n], and only in a case where information is stored there, the following processing is performed.

Subsequently, with regard to the second detection result D2 [m], the processing is repeatedly performed from m=1 to M.

Like the first detection result D1 [n], as a result of the tracking processing, the second detection result D2 [m] includes a portion where information is lost, and therefore, the processing is performed on entire allocated area of the second detection result D2 [m], and only in a case where information is stored there, the following processing is performed.

In step S1411, the first detection position interpolation unit 14 calculates the degree of consistency MATCH between the first detection result D1 [n] and the second detection result D2 [m]. In the present embodiment, the degree of consistency MATCH is derived by using the same method as the calculation method of the overlapping rate OVR explained in the tracking processing explained above, and therefore, detailed explanation thereabout is omitted.

Subsequently, in step S1412, a determination is made as to whether the degree of consistency MATCH is more than threshold value TH_MATCH or not. In a case where the degree of consistency MATCH is more than the threshold value TH_MATCH, step S1413 is subsequently performed, and the first detection result D1 [n] and the second detection result D2 [m] are determined to be the same object.

The above processing is repeatedly executed from m=1 to M, and further, repeatedly executed from n=1 to N. With the above processing, a detection result from the same object (i.e., the same pedestrian) in the first detection result D1 [n] which is output from the first detection unit 12 and the second detection result D2 [m] which is output from the second detection unit 13 is determined.

Figure 12:
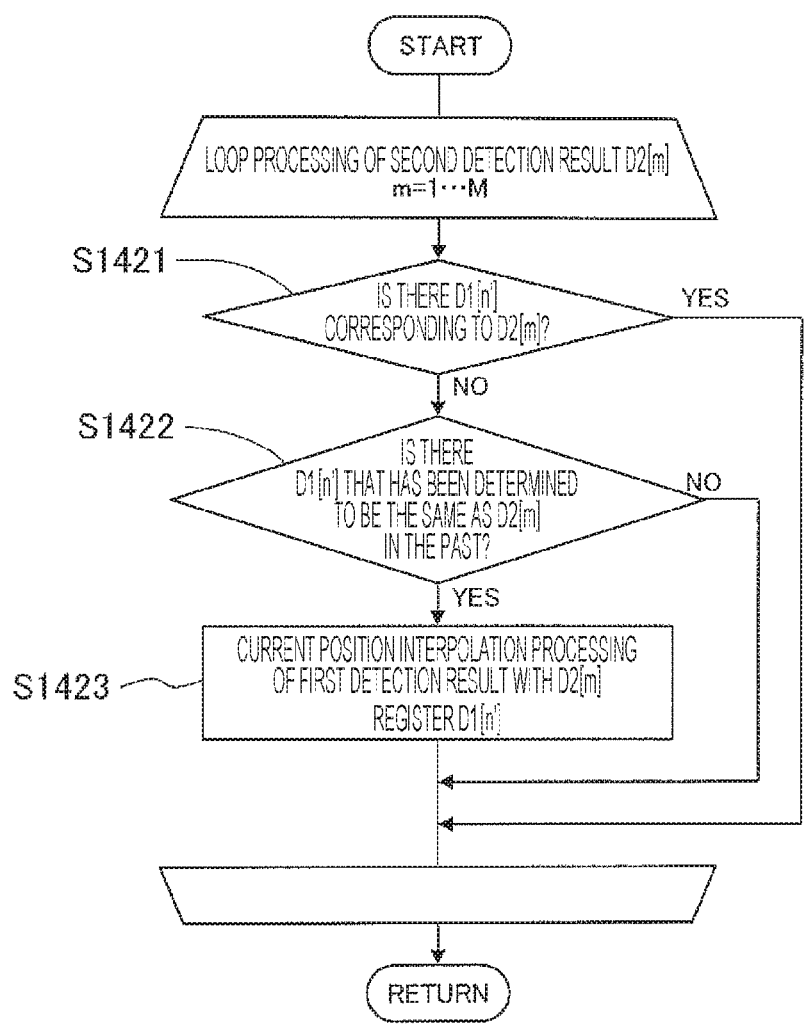
FIG. 12 is a flowchart explaining a processing flow of current position interpolation processing as illustrated in FIG. 10.

Subsequently, as illustrated in FIG. 10, in step S142, the first detection position interpolation unit 14 performs interpolation processing (current position interpolation processing) of the first detection result D1 [n] using the second detection result D2 [m]. FIG. 12 is a flowchart explaining a processing flow of this current position interpolation processing.

First, with regard to the second detection result D2 [m], the processing is repeatedly performed from m=1 to M. In this case, as a result of the tracking processing, the second detection result D2 [m] includes a portion where information is lost, and therefore, the processing is performed on entire allocated area of the second detection result D2 [m], and only in a case where information is stored there, the following processing is performed.

In step S1421, the first detection position interpolation unit 14 confirms presence/absence of the first detection result D1 [n'] that is determined to be the same object as the second detection result D2 [m]. In a case where the first detection result D1 [n'] that is determined to be the same object as the second detection result D2 [m] does not exist, step S1422 is subsequently executed, and in a case where the first detection result D1 [n'] that is determined to be the same object as the second detection result D2 [m] exists, steps S1422 and S1423 are skipped.

Subsequently, in step S1422, the past information D2_Z [m] of the second detection result D2 [m] is referred to, and presence/absence of existence of the past information D1_Z [n'] of the first detection result corresponding to the past information D2_Z [m] is confirmed. In this case, the past information is not limited to the previous cycle, and past information of several cycles before may also be used. In a case where the past information D1_Z [n'] corresponding to the past information D2_Z [m] exists, step S1423 is subsequently executed, and in a case where the past information D1_Z [n'] corresponding to the past information D2_Z [m] does not exist, S1423 is skipped.

Subsequently, in step S1423, the interpolation processing, i.e., the current position interpolation processing of the first detection result D1 [n], is performed. When step S1423 is performed, this means that D1_Z [n'] and D2_Z [m] are detects as the same object in the past, and the first detection unit 12 does not detect the object in the current cycle, but the second detection unit 31 has detected and tracked the object. Therefore, where the rectangle information of the second detection result D2 [m] in the current cycle is denoted as (SX2, SY2, EX2, EY2), and the rectangle information of the past information D1_Z [n'], D2_Z [m] are denoted as (SX1_Z, SY1_Z, EX1_Z, EY1_Z), (SX2_Z, SY2_Z, EX2_Z, EY2_Z), respectively, the first detection result D1 [n'] in the current cycle can be predicted from the relationship of the positions in the past between the first detection result and the second detection result from the following expression (5).

[Expression 5]

$$SX1P=(SX1\_Z-SX2\_Z)+SX2$$

$$SY1P=(SY1\_Z-SY2\_Z)+SY2$$

$$EX1P=(EX1\_Z-EX2\_Z)+EX2$$

$$EY1P=(EY1\_Z-EY2\_Z)+EY2 \qquad (5)$$

The rectangle information (SX1P, SY1P, EX1P, EY1P) obtained from the above expression is registered to D1 [n] as the first position information interpolation information D1 [n'] interpolating the first detection result. At this occasion, as described above, the same object is registered to the same ID according to the tracking processing of the first detection unit 12, and therefore, it may be registered to n=n'. The above processing is repeatedly executed from m=1 to M.

Figure 13:
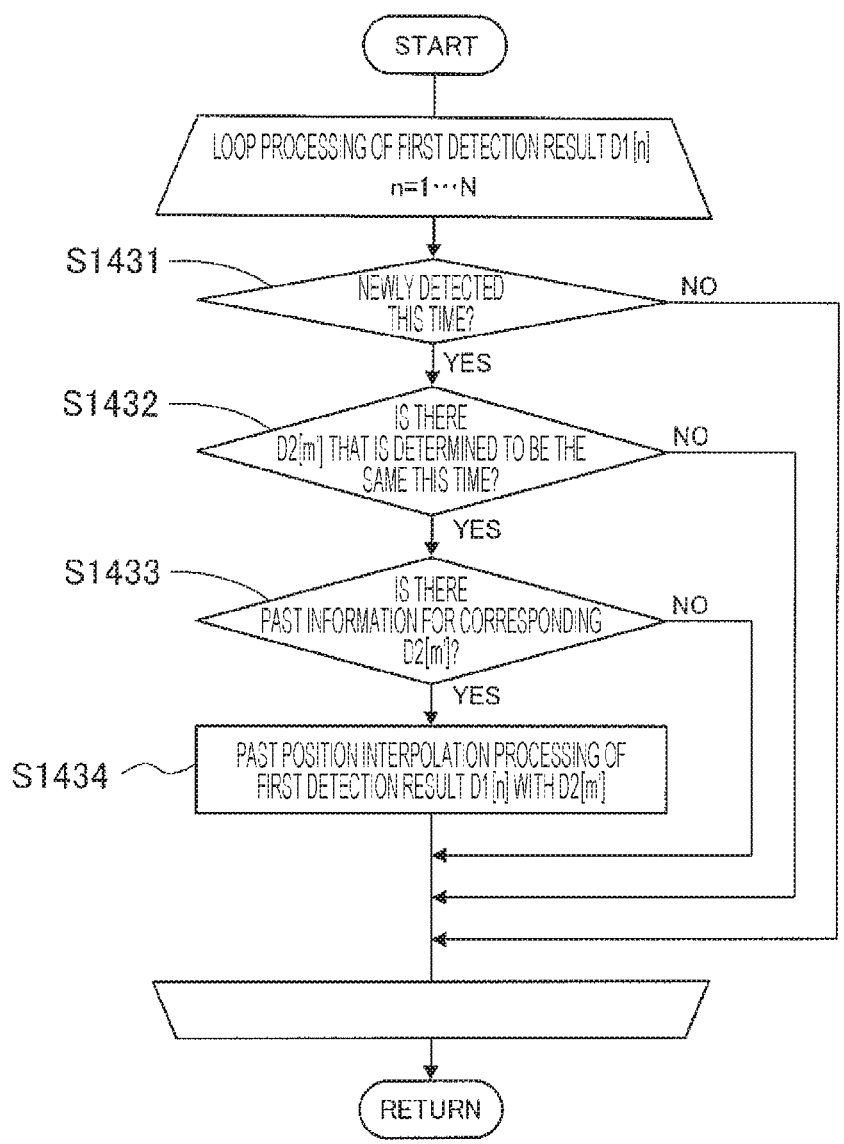
FIG. 13 is a flowchart explaining a processing flow of past position interpolation processing as illustrated in FIG. 10.

Subsequently, as illustrated in FIG. 10, in step S143, the first detection position interpolation unit 14 carries out the interpolation processing of the past position of the first detection result D1 [n] (past position interpolation processing) by using the second detection result D2 [m]. FIG. 13 is a flowchart explaining a processing flow of the past position interpolation processing.

First, with regard to the first detection result D1 [n], the processing is repeatedly performed from n=1 to N. In this case, as a result of the tracking processing, the first detection result D1 [n] includes a portion where information is lost, and therefore, the processing is performed on entire allocated area of the first detection result D1 [n], and only in a case where information is stored there, the following processing is performed.

In step S1431, the first detection position interpolation unit 14 determines whether the first detection result D1 [n] is a new detection result or not. In a case where the first detection result D1 [n] is a new detection object, step S1432 is subsequently executed, and in a case where the first detection result D1 [n] is not a new detection object, the processing in steps S1432 to S1434 below are skipped.

Subsequently, in step S1432, presence/absence of D2 [m'] determined to be the same object as the first detection result D1 [n] is confirmed. In a case where D2 [m'] determined to be the same object as the first detection result D1 [n] exists, step S1433 is subsequently executed, and D2 [m'] determined to be the same object as the first detection result D1 [n] does not exist, the processing in steps S1433, S1434 below are skipped.

Subsequently, in step S1433, a determination as to whether the past information D2_Z [m'] exists in D2 [m'] determined to be the same object as the first detection result D1 [n]. In a case where the past information D2_Z [m'] exists, step S1434 is subsequently executed, and in a case where the past information D2_Z [m'] does not exist, the processing in step S1434 is skipped.

Subsequently, in step S1434, the interpolation processing of the past information of the first detection result D1 [n] (past position interpolation processing) is performed. In a case where step S1434 is executed, this means that the first detection result D1 [n] is a new detection object but the past information D2_Z [m'] exists in D2 [m'] determined to be the same object as the first detection result D1 [n]. Therefore, where the rectangle information of the first detection result D1 [n] in the current cycle and the second detection result D2 [m'] are denoted as (SX1, SY1, EX1, EY1), (SX2, SY2, EX2, EY2), and the rectangle information of the past information D2_Z [n] is denoted as (SX2_Z, SY2_Z, EX2_Z, EY2_Z), the first detection result D1 [n'] in the past can be predicted from the relationship of the positions in the current cycle between the first detection result and the second detection result from the following expression (6).

[Expression 6]

$SX1\_ZP=(SX1-SX2)+SX2\_Z$ $SY1\_ZP=(SY1-SY2)+SY2\_Z$ $EX1\_ZP=(EX1-EX2)+EX2\_Z$ $EY1\_ZP=(EY1-EY2)+EY2\_Z$ (6)

The rectangle information (SX1_ZP, SY1_ZP, EX1_ZP, EY1_ZP) obtained from the above calculation is registered as the past information of the first detection result D1 [n] (past position) serving as the first position information interpolation information interpolating the first detection result. This past information can perform interpolation as long as there exists past information of D2 [m], e.g., past information D1_Z1 [n'] of one cycle before D2 [m] and past information D1_Z2 [n'] two cycles before D2 [m]. In the present embodiment, an array is ensured to interpolate cycles up to as many as 10 cycles before, and in a case where the past value of D2 [m] includes 10 cycles or less, the interpolation is performed for the cycles included therein, and in a case where the past value of D2 [m] includes 10 cycles or more, the interpolation is performed for the ten cycles. The above processing is repeatedly executed from n=1 to N.

[Distance Measurement Unit]

Figure 14:
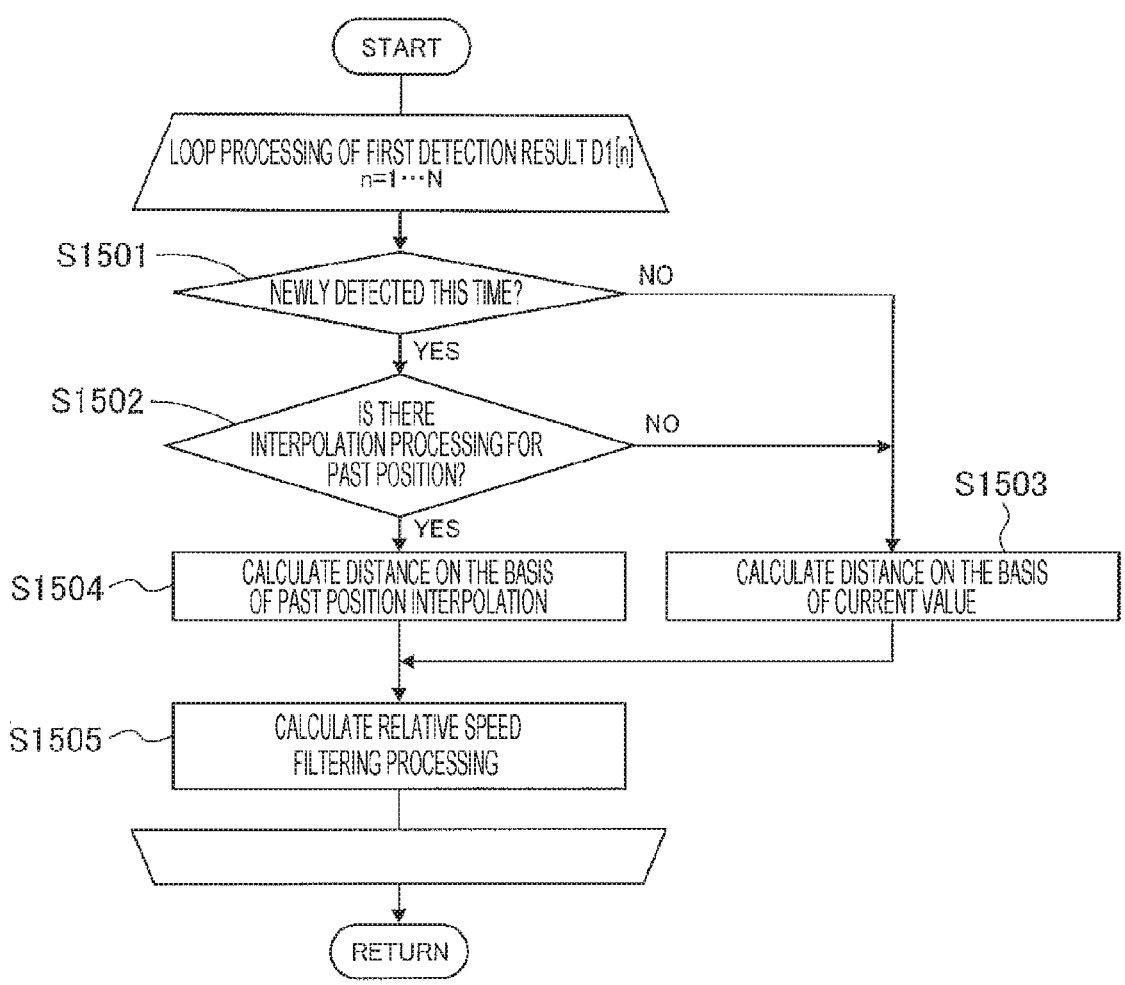
FIG. 14 is a flowchart explaining a processing flow of a distance measurement unit as illustrated in FIG. 1.

Subsequently, a processing content performed with the distance measurement unit 15 will be explained with reference to FIG. 14. FIG. 14 is a flowchart explaining a processing flow of the distance measurement unit 15. In this case, the distance measurement unit 15 calculates the relative speed and the relative distance with respect to the object (pedestrian) on the image on the basis of the first detection result D1 [n] of the first detection unit 12 suitable for the calculation of the relative speed and the relative distance with respect to the object.

First, with regard to the first detection result D1 [n], the distance measurement unit 15 repeatedly performs the processing from n=1 to N. In this case, as a result of the tracking processing, the first detection result D1 [n] includes a portion where information is lost, and therefore, the processing is performed on entire allocated area of the first detection result D1 [n], and only in a case where information is stored there, the following processing is performed.

In step S1501, the distance measurement unit 15 determines whether the first detection result D1 [n] which is output from the first detection unit 12 is a new detection object. When the first detection result D1 [n] is a new detection object, step S1502 is subsequently executed, and when the first detection result D1 [n] is not a new detection object, step S1503 is subsequently executed.

Subsequently, in step S1502, a determination is made as to whether the past value of the first detection result D1 [n] involves interpolation processing. When the past value involves the interpolation processing, step S1504 is subsequently executed, when the past value does not involve the interpolation processing, step S1503 is subsequently executed.

In a case where the first detection result D1 [n] is not a new detection object, or in a case where the past value does not involve the interpolation processing, the relative distance and the relative speed with respect to the object (pedestrian) is calculated by using the first detection result (current value) D1 [n] which is output from the first detection unit 12 in step S1503. The method for calculating the relative distance between the driver's vehicle and the object from the rectangle information (SX1, SY1, EX1, EY1) of the first detection result D1 [n] includes various methods as long as the camera parameters are already known. For example, there is a method for assuming the height and the width of a pedestrian and calculating the relative distance from the height and the width on the image and the camera parameters. Further, there is a method for calculating the relative distance from the camera parameters and the image coordinate at the center of the lower end of the rectangle information (i.e., a ground contact coordinate). Still further, there is a method for detecting the feet of the pedestrian from the rectangle information (i.e., a ground contact coordinate) and calculating the relative distance and the relative speed by using the detected coordinate and the camera parameters. In the present embodiment, the relative position (PX, PY) from the center of the front end of the vehicle to the object (pedestrian) is measured by using, for example, the method for performing calculating from the image coordinate at the center of the lower end of the rectangle information (i.e., a ground contact coordinate) and the camera parameter.

On the other hand, in a case where the first detection result D1 [n] is a new detection object and where the past value involves the interpolation processing, the relative distance and the relative speed with respect to the object (pedestrian) is calculated by using the first detection result D1 [n] and the past value D1_Z [n] of the first detection result D1 [n]

serving as the first position information interpolation information in step S1504. In the calculation method using the past value D1_Z [n], the same distance measurement as step S1503 is performed at all the points in the past, and all the obtained relative position (PX, PY) is saved as (PX_Z1, PY_Z1), (PX_Z2, PY_Z2) and the like.

Subsequently, in step S1505, the relative speed from the object (pedestrian) is calculated, and the filtering processing is performed. The relative speed is derived from the difference of the relative position (PX, PY) calculated for each cycle, and thereafter the filtering processing is performed for smoothing. At this occasion, in a case where there is a past value via step S1504, the relative speed and the filtering processing are calculated again from the value that exists most recently in the past, and the current value is calculated. Alternatively, Kalman filter processing is performed on the relative position (PX, PY) explained above. This Kalman filter processing is a known technique, and therefore, detailed explanation thereabout is omitted, but when the observation value is defined as the relative position (PX, PY) and at least the relative position (PX, PY) and the relative speed (VX, VY) are configured to be included at the internal state, the relative position and the relative speed can be derived while the relative position and the relative speed are smoothed in accordance with the Kalman filter processing. The above processing is repeatedly executed from n=1 to N.

The relative distance and the relative speed with respect to the object (pedestrian) calculated by the distance measurement unit 15 are output an external device such as a controller, a warning apparatus, and the like of the vehicle provided outside via the output unit 16.

[Actions and Effects of the First Embodiment]

The actions and the effects of the vehicle surroundings recognition apparatus 10 according to the first embodiment explained above will be explained with reference to FIG. 15A to FIG. 16. FIG. 15A is a schematic diagram schematically illustrating an example of presence/absence of detection with the first detection unit 12 and the second detection unit 13 at a processing timing in a case where a pedestrian who crosses the course in front of the driver's vehicle is detected by using the vehicle surroundings recognition apparatus 10, and FIG. 15B is an explanatory diagram explaining an example of presence/absence of detection with the first detection unit 12 and the second detection unit 13 and a processing method with the distance measurement unit 15 at a processing timing. In FIG. 15B, in the example of the first detection unit 12 and the second detection unit 13, a circle (○) is used indicate a case where the position information about the object (pedestrian) is detected, and a cross (x) is used indicate a case where the position information about the object (pedestrian) is not detected. In the example of the distance measurement unit 15, a cross (x) is used to indicate a case where the measurement of the relative distance with respect to the object (pedestrian) is not performed, a circle (○) is used to indicate a case where the measurement of the relative distance is performed by using the first detection result (current value) D1 [n] (see step S1503 in FIG. 14), and a double circle is (◎ is used to indicate a case where the measurement of the relative distance is performed by using the first detection result D1 [n] and the first position information interpolation information for interpolating the first detection result (see step S1504 in FIG. 14).

Figure 15C:
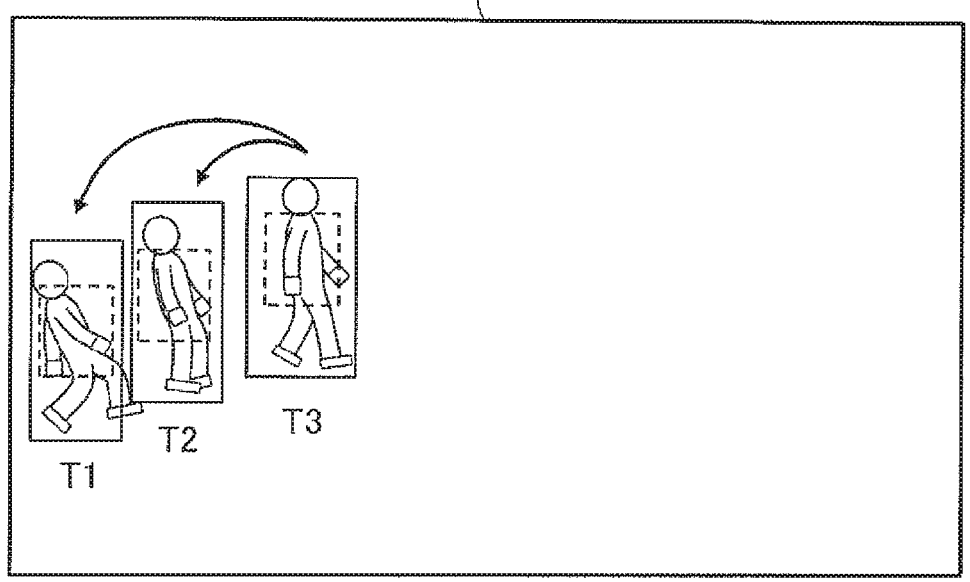
FIG. 15C is an explanatory diagram schematically explaining past position interpolation processing at processing timings T1, T2 as illustrated in FIG. 12A.

As illustrated in FIG. 15A, in the example where the pedestrian crosses the course in front of the vehicle over the times T1 to T7, the first detection unit 12 detects the pedestrian at the times T3 to T5 and the time T7, and the second detection unit 13 detects the pedestrian at the times T1 to T7. At this occasion, first, at the time T3, the vehicle surroundings recognition apparatus 10 according to the first embodiment performs the interpolation processing (past position interpolation processing) of the past value of the first detection result D1 [n] with the first detection position interpolation unit 14. More specifically, as illustrated in FIG. 15C, the first detection result at the times T1, T2 (the position information about the object (pedestrian) not detected by the first detection unit 12 at the times T1, T2) is interpolated on the basis of the relative relationship of the position of the first detection result D1 [n] and the second detection result D2 [m] at the time T3, and the relative position and the relative speed with respect to the object is calculated again at the time T3.

Figure 15D:
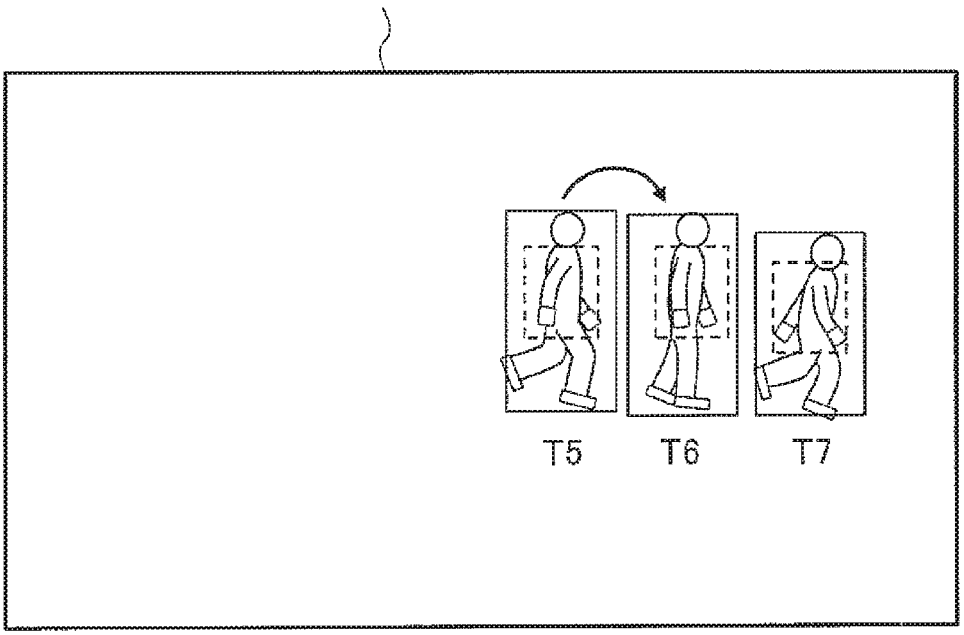
FIG. 15D is an explanatory diagram schematically explaining current position interpolation processing at a processing timing T6 as illustrated in FIG. 12A.

At the time T6, the vehicle surroundings recognition apparatus 10 according to the first embodiment performs the interpolation processing of the first detection result D1 [n] with the first detection position interpolation unit 14 (current position interpolation processing). More specifically, as illustrated in FIG. 15D, the first detection position D1 [n] at the time T6 is interpolated on the basis of the second detection result D2 [m] at the time T6 and the relative relationship in the position between the first detection result D1 [n] and the second detection result D2 [m] at the time T5, and the relative position and the relative speed with respect to the object at the time T6 is calculated.

It should be noted that the first detection position D1 [n] at the time T6 (the position information about the object (pedestrian) not detected by the first detection unit 12 at the time T6) may be interpolated on the basis of the relative relationship in the position of the first detection result D1 [n] and the second detection result D2 [m] at the time T7.

Figure 16:
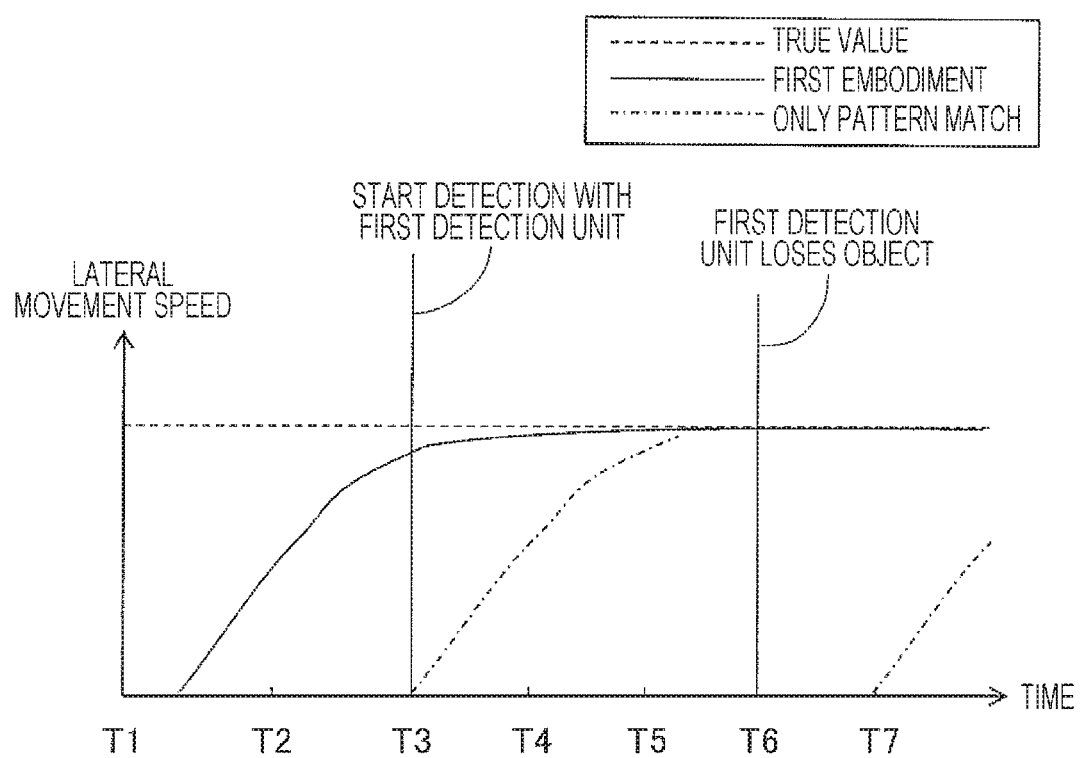
FIG. 16 is a figure illustrating an example of a measurement result of a lateral movement speed of a pedestrian with a vehicle surroundings recognition apparatus as illustrated in FIG. 1 and a measurement result of a lateral movement speed of a pedestrian in a case of measurement with only a process of pattern matching.

FIG. 16 is a figure illustrating an example of a measurement result of the lateral movement speed of the pedestrian with the vehicle surroundings recognition apparatus 10 as illustrated in FIG. 1 and a measurement result of the lateral movement speed of the pedestrian in a case where it is measured with only the process of pattern matching. In FIG. 16, the vertical axis represents a relative moving speed in the horizontal direction of the pedestrian, the horizontal axis represents a time, the broken line in the figure represents a true value of the lateral movement speed of the pedestrian, the solid line represents the lateral movement speed of the pedestrian in a case where the vehicle surroundings recognition apparatus 10 according to the first embodiment performs calculation, and the alternate long and short dashed line represents the lateral movement speed of the pedestrian in a case where calculation is performed with only the process of pattern matching.

As illustrated in the drawing, in a case where the calculation is performed with only the process of pattern matching (the same processing as the first detection unit 12), the object (pedestrian) is first detected at the time T3 in the process of pattern matching, and the object is lost at the time T6. In this case, the calculation of the relative distance and the relative speed is started after the object is first detected at the time T3, and the filtering is performed by calculating the relative speed with respect to the object by using the detection result at the times T4, T5 after the time T3, and therefore, the convergence to the true value is delayed. The object is lost at the time T6, and therefore the calculation result until then is lost, and it is necessary to start the calculation of the relative speed again upon detecting the object again at the time T7, and therefore, the convergence to the true value is further delayed.

On the other hand, as illustrated in FIG. 1, in a case where the vehicle surroundings recognition apparatus 10 performs the calculation, the second detection unit 13 uses the optical flow to detect the object at all times, and when the first detection unit 12 first detects the object (pedestrian) at the time T3, the first detection position interpolation unit 14 performs the interpolation of the past value of the first detection result, and therefore, a relative speed equivalent to a relative speed obtained when the relative speed is calculated from the time T1 can be obtained, and the relative speed at the time T3 is somewhat close to the true value. In a case where the first detection unit 12 loses the object at the time T6, the first detection position interpolation unit 14 performs the interpolation of the first detection result at the time T6, and therefore, the calculation result of the relative speed is not interrupted, and the calculated relative speed becomes more closer to the true value of the lateral movement speed of the pedestrian.

As described above, according to the vehicle surroundings recognition apparatus 10 of the first embodiment, a first state in which the first detection unit 12 and the second detection unit 13 detect the first position information (first detection result) and the second position information (second detection result) of the pedestrian from the image 200 obtained by performing image-capturing around the vehicle and a second state in which only the second detection unit 13 detects the second position information about the object from the image 200 occur in a time sequence, the first position information interpolation information interpolating the first position information about the object in the second state is calculated on the basis of the first position information and the second position information in the first state and the second position information in the second state, so that even in a case where the position information about the object such as the pedestrian is not detected in some of the images 200 by the first detection unit 12, the calculation accuracy of the relative position and the relative speed with respect to the object can be enhanced. More specifically, for example, even in a case where the first detection unit 12 cannot detect the position information about the pedestrian who crosses the course of the driver's vehicle in some of the images 200 because of the camera distortion when a wide angle camera is used or a pattern change of the pedestrian on the image, the past value and the current value of the first position information about the pedestrian detected with the first detection unit 12 can be interpolated by using the second position information about the pedestrian detected with the second detection unit 13, and therefore, the relative position and the relative speed between the driver's vehicle and the pedestrian can be accurately calculated.

In the above first embodiment, a pedestrian is employed as the detection target of the process of pattern matching performed by the first detection unit 12, but the detection target of the first detection unit 12 can be set appropriately. For example, only the leg portion shape of the pedestrian most suitable for calculation of the relative distance and the relative speed can be adopted as the detection target of the first detection unit 12.

Second Embodiment

Figure 17:
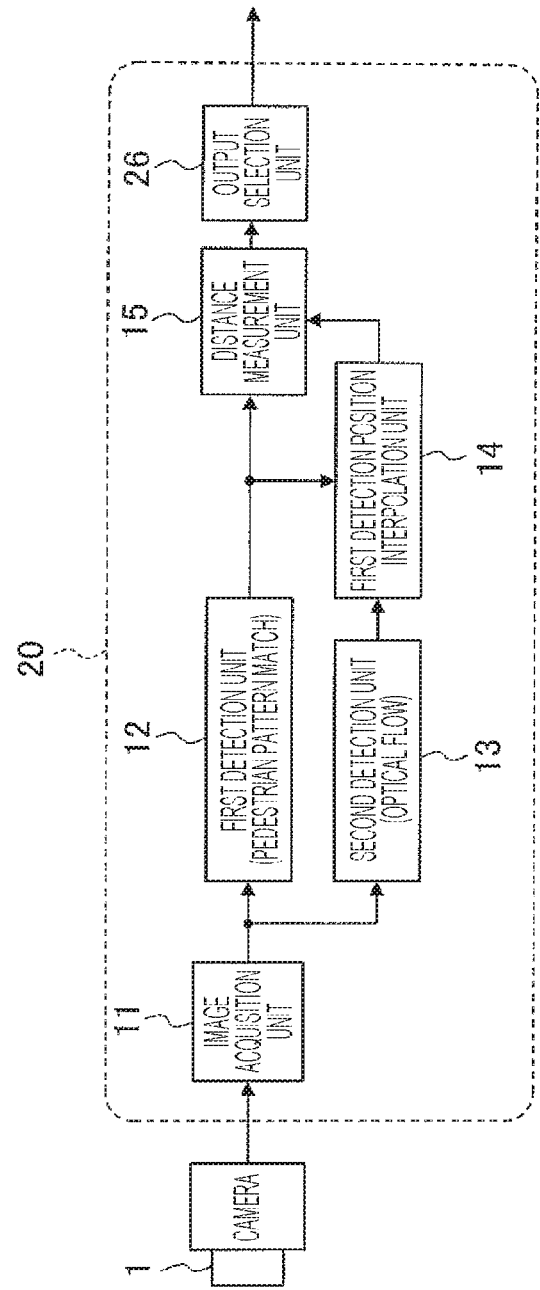
FIG. 17 is a block diagram illustrating an entire configuration of a second embodiment of a vehicle surroundings recognition apparatus according to the present invention.
Figure 18:
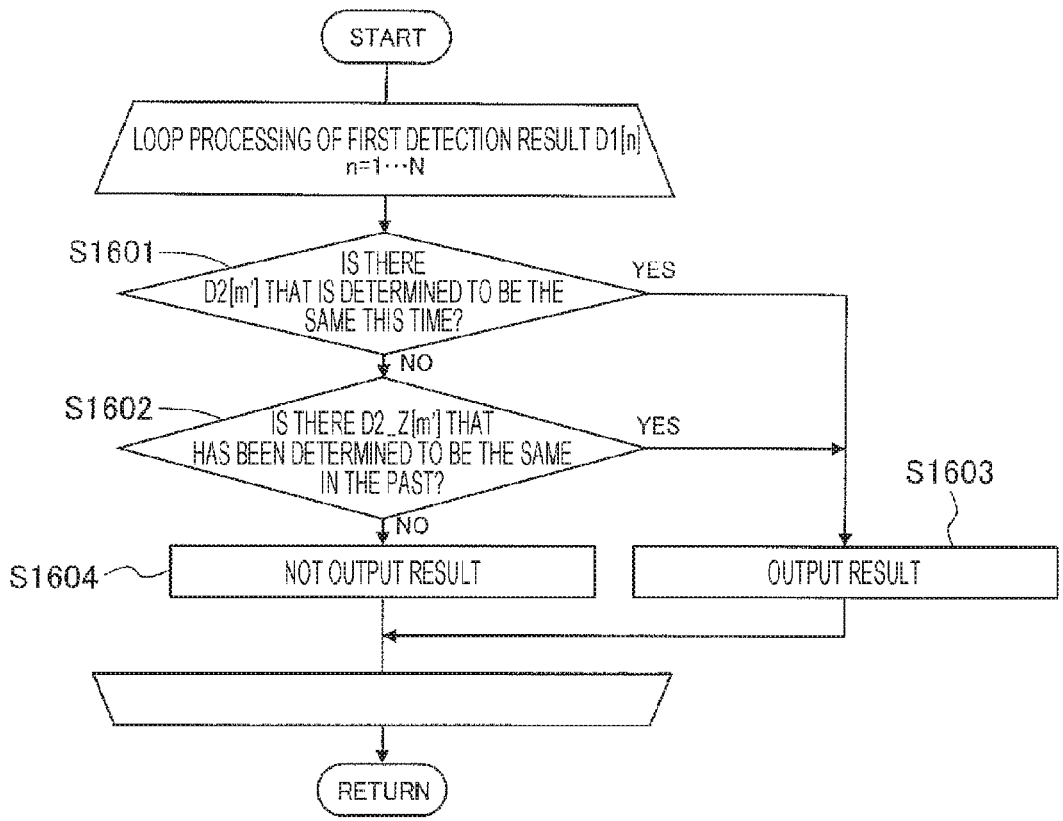
FIG. 18 is a flowchart explaining a processing flow of an output selection unit as illustrated in FIG. 17.

Subsequently, the second embodiment of the vehicle surroundings recognition apparatus according to the present invention will be explained in details with reference to FIG. 17 and FIG. 18. FIG. 17 is a block diagram illustrating a vehicle surroundings recognition apparatus 20 according to the second embodiment. As illustrated in FIG. 17, the vehicle surroundings recognition apparatus 20 according to the second embodiment is different in the configuration of the output selection unit 26 from the vehicle surroundings recognition apparatus 10 according to the first embodiment as illustrated in FIG. 1, and the configuration other than that is the same as the vehicle surroundings recognition apparatus 10 according to the first embodiment. Therefore, in the following explanation, only the configuration different from the vehicle surroundings recognition apparatus 10 according to the first embodiment will be described in details, and the same elements as the first embodiment will be denoted with the same reference numerals, and detailed explanation thereabout will be omitted.

The vehicle surroundings recognition apparatus 20 is incorporated into the inside of a camera apparatus provided on a vehicle such as an automobile or in the inside of a unification controller and the like, and the vehicle surroundings recognition apparatus 20 is configured to detect an object from an image captured by a camera 1 of the camera apparatus, and in the present embodiment, the vehicle surroundings recognition apparatus 20 is configured to detect, in particular, a pedestrian among the objects around the vehicle.

The vehicle surroundings recognition apparatus 20 is constituted by a computer having a CPU, a memory, an I/O, and the like, and is configured to be programmed for predetermined processing and execute processing repeatedly with a cycle T defined in advance.

As illustrated in FIG. 17, the vehicle surroundings recognition apparatus 20 includes an image acquisition unit 11, a first detection unit 12, a second detection unit 13, a first detection position interpolation unit 14, a distance measurement unit 15, and an output selection unit 26. In the following explanation, only the processing performed by the output selection unit 26 will be explained in details.

[Output Selection Unit]

A processing content performed with the output selection unit 26 will be explained with reference to FIG. 18. FIG. 18 is a flowchart explaining a processing flow of the output selection unit 26.

First, with regard to the first detection result D1 [n], the output selection unit 26 repeatedly performs the processing from n=1 to N. In this case, as a result of the tracking processing, the first detection result D1 [n] includes a portion where information is lost, and therefore, the processing is performed on entire allocated area of the first detection result D1 [n], and only in a case where information is stored there, the following processing is performed.

In step S1601, the output selection unit 26 confirms presence/absence of the second detection result D2 [m'] that is determined to be the same object as the first detection result D1 [n]. In a case where the second detection result D2 [m'] that is determined to be the same object as the first detection result D1 [n] exists, step S1603 is subsequently executed, and in a case where the second detection result D2 [m'] that is determined to be the same object as the first detection result D1 [n] does not exist, step S1602 is subsequently executed.

Subsequently, in step S1602, presence/absence of the past value D2_Z [m'] of the second detection result D2 [m'] that is determined to be the same object as the past value D1_Z [n] of the first detection result D1 [n] is confirmed. In a case where the past value D2_Z [m'] that is determined to be the same object as the past value D1_Z [n] exists, step S1603 is subsequently executed, and in a case where the past value D2_Z [m'] that is determined to be the same object as the past value D1_Z [n] does not exist, step S1604 is subsequently executed.

In a case where the second detection result D2 [m'] that is determined to be the same object as the first detection result D1 [n] exists, or in a case where the past value D2_Z [m'] of the second detection result D2 [m'] that is determined to be the same object as the past value D1_Z [n] of the first detection result D1 [n] exists, the relative position and the relative speed with respect to the object (pedestrian) measured by the distance measurement unit 15 by using the first detection result D1 [n] and the like are output to the outside of the vehicle surroundings recognition apparatus 20 via, for example a LAN in step S1603. More specifically, the result that is output here is a result for the object detected by both of the first detection unit 12 and the second detection unit 13 currently or in the past.

On the other hand, in a case where the second detection result D2 [m'] that is determined to be the same object as the first detection result D1 [n] does not exist and where the past value D2_Z [m'] of the second detection result D2 [m'] that is determined to be the same object as the past value D1_Z [n] of the first detection result D1 [n] does not exist, the relative position and the relative speed measured by the distance measurement unit 15 by using the first detection result D1 [n] and the like are not output to the outside of the vehicle surroundings recognition apparatus 20 in step S1604. This result is a result for the object detected with only the first detection unit 12 until then. More specifically, in a case where the object (pedestrian) is detected with only the first detection unit 12 until then, the relative position and the relative speed with respect to the object is calculated by the distance measurement unit 15, but the output selection unit 26 may output the relative position and the relative speed for the object to the external device provided outside of the vehicle surroundings recognition apparatus 20.

[Actions and Effects of the Second Embodiment]

As explained above, according to the vehicle surroundings recognition apparatus 20 of the second embodiment, only after the first position information and the second position information about the object (pedestrian) which is the detection target are detected by both of the first detection unit 12 and the second detection unit 13 currently or in the past, the relative position and the relative speed measured with regard to the object are output to an external device such as a controller, a warning apparatus, and the like of the vehicle provided outside of the vehicle surroundings recognition apparatus 20, and therefore, only the highly reliable result for the object that is detected by both of the techniques of the first detection unit 12 and the second detection unit 13 can be output to an external device such as a controller, a warning apparatus, and the like of the vehicle. The relative position and the relative speed for the object detected with only the first detection unit 12 is not output to an external device such as a controller, a warning apparatus, and the like of the vehicle provided outside of the vehicle surroundings recognition apparatus 20, but as described above, the calculation of the relative position and the relative speed is performed by the distance measurement unit 14 even for such object, and therefore, like the vehicle surroundings recognition apparatus 10 of the first embodiment, the calculated relative speed becomes closer to the true value of the lateral movement speed of the pedestrian, and therefore, the calculation accuracy of the relative position and the relative speed with respect to the object can be enhanced. In other words, the relative position and the relative speed measured by the distance measurement unit 14 are output to an external device such as a controller, a warning apparatus, and the like of the vehicle provided outside of the vehicle surroundings recognition apparatus 20 at a timing when the object is detected by both of the first detection unit 12 and the second detection unit 13, but the relative position and the relative speed is calculated before the output by the distance measurement unit 14, and therefore, while only the highly reliable result for the object is output an external device such as a controller, a warning apparatus, and the like of the vehicle, the true value of the lateral movement speed of the pedestrian of the relative speed calculated can be suppressed.

Third Embodiment

Figure 19:
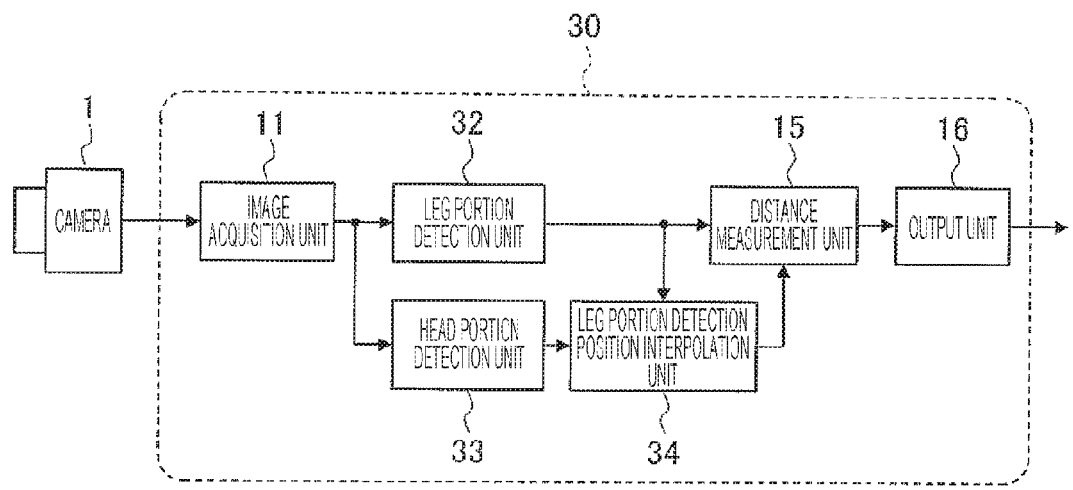
FIG. 19 is a block diagram illustrating an entire configuration of a third embodiment of a vehicle surroundings recognition apparatus according to the present invention.
Figure 20:
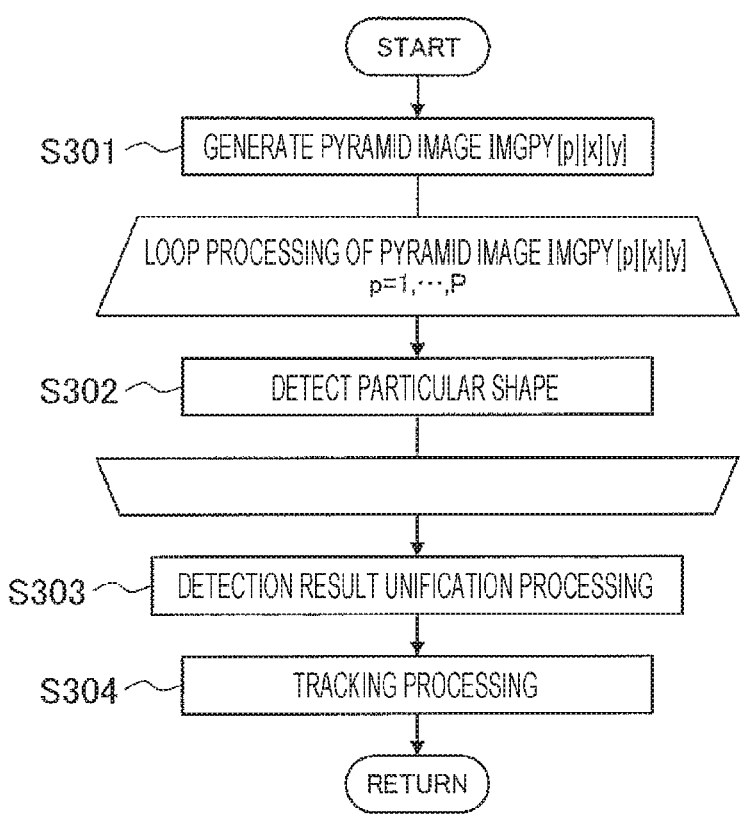
FIG. 20 is a flowchart explaining a processing flow of a leg portion detection unit as illustrated in FIG. 19.

Subsequently, the third embodiment of the vehicle surroundings recognition apparatus according to the present invention will be explained in details with reference to FIG. 19 and FIG. 20. FIG. 19 is a block diagram illustrating a vehicle surroundings recognition apparatus 30 according to the third embodiment. As illustrated in FIG. 19, the vehicle surroundings recognition apparatus 30 according to the second embodiment is different in the technique for detecting the position information about the object (pedestrian) in the image from the vehicle surroundings recognition apparatus 10 according to the first embodiment as illustrated in FIG. 1, and the configuration other than that is the same as the vehicle surroundings recognition apparatus 10 according to the first embodiment. Therefore, in the following explanation, only the configuration different from the vehicle surroundings recognition apparatus 10 according to the first embodiment will be described in details, and the same elements as the first embodiment will be denoted with the same reference numerals, and detailed explanation thereabout will be omitted.

The vehicle surroundings recognition apparatus 30 is incorporated into the inside of a camera apparatus provided on a vehicle such as an automobile or in the inside of a unification controller and the like, and the vehicle surroundings recognition apparatus 30 is configured to detect an object from an image captured by a camera 1 of the camera apparatus, and in the present embodiment, the vehicle surroundings recognition apparatus 30 is configured to detect, in particular, a pedestrian among the objects around the vehicle.

The vehicle surroundings recognition apparatus 30 is constituted by a computer having a CPU, a memory, an I/O, and the like, and is configured to be programmed for predetermined processing and execute processing repeatedly with a cycle T defined in advance.

As illustrated in FIG. 19, the vehicle surroundings recognition apparatus 30 includes an image acquisition unit 11, a leg portion detection unit 32, a head portion detection unit 33, a leg portion detection position interpolation unit 34, distance measurement unit 15, and an output unit 16. In the following explanation, only the processing performed by the leg portion detection unit 32, the head portion detection unit 33, and the leg portion detection position interpolation unit 34 will be explained in details.

[Leg Portion Detection Unit]

The leg portion detection unit 32 detects a pattern similar to a leg portion of a pedestrian from an image 200 obtained by the image acquisition unit 11 (see FIG. 2), and outputs the detection result D1 [n] thereof. This detection result D1 [n] is an array of a table having coordinates (SX, SY, EX, EY) on the image of the detected pedestrian leg portion elements, and n denotes an ID in a case where multiple detections are made.

A processing content performed with the leg portion detection unit 32 will be explained with reference to FIG. 20. FIG. 20 is a flowchart explaining a processing flow of the leg portion detection unit 32.

First, in step S301, the leg portion detection unit 32 generates a pyramid image IMGPY [p] [x] [y] from an image IMGSRC [x] [y]. The pyramid image IMGPY [p] [x] [y] is an image group constituted by P images, and includes images obtained by reducing the image IMGSRC [x] [y] by predetermined rates in order. In the present embodiment, the pyramid image IMGPY [p] [x] [y] stores images obtained by reducing the image IMGSRC [x] [y] by a reduction rate 0.8, e.g., the image of the pyramid image IMGPY [p] [x] [y] at p=0 stores the same image as the image IMGSRC [x] [y], the image at p=1 stores an image obtained by reducing IMGPY [0] [x] [y] by the reduction rate 0.8, the image at p=2 stores an image obtained by reducing IMGPY [1] [x] [y] by the reduction rate 0.8.

In this case, distortion correction of the images may be performed on the basis of the camera parameters of the camera 1.

Subsequently, processing is performed by repeatedly executing step S302 from p=1 to p=P with regard to the pyramid image IMGPY [p] [x] [y]. In step S302, a particular shape is detected from the pyramid image IMGPY [p] [x] [y] (i.e., a leg portion shape of the pedestrian). Various methods may be considered as the detection method of the particular shape, but any detection method may be used. For example, detection may be performed by extracting a representing shape of a leg portion from a walking pattern of a pedestrian and applying template matching explained in the first embodiment. The above processing explained above is repeatedly performed from p=1 to p=P.

Subsequently, in step S303, a detection result of the processing in step S302 (raster scan processing) is unified. In this unification method, there are various known techniques, and therefore, detailed explanation thereabout is omitted here, but in the present embodiment, for example, a known technique called Mean Shift (mean shift method) is used. Then, the unification result thereof is stored to D1M [r]. In this case, D1M indicates detection position coordinates (SX, SY, EX, EY) on the image.

Subsequently, in step S304, the tracking processing is performed. This tracking processing is the same as the processing content of the first detection unit 12 in the first embodiment explained with reference to FIG. 8, and therefore, the detailed explanation thereabout is omitted here.

As a result of this processing performed with the leg portion detection unit 32, the pedestrian leg portion pattern detection result based on the process of pattern matching is output as a leg portion detection result (first position information) D1 [n].

[Head Portion Detection Unit]

The head portion detection unit 33 detects a pattern similar to a head portion of a pedestrian from an image 200 obtained by the image acquisition unit 11 (see FIG. 2), and outputs the detection result D2 [m] thereof. This detection result D2 [m] is an array of a table having coordinates (SX, SY, EX, EY) on the image of the detected pedestrian head portion elements, and m denotes an ID in a case where multiple detections are made.

A processing content performed with the head portion detection unit 33 is substantially the same as the processing content performed with the leg portion detection unit 32 explained with reference to FIG. 20, and therefore, detailed explanation thereabout is omitted. However, in a case where the head portion of a pedestrian is detected from an image, not only the pattern match technique and the template matching explained above but also a circle detection technique can be applied to the particular shape detection in step S302 as illustrated in FIG. 20, and in addition, a technique for detecting an Ω shape and protruding shape extending from the head portion to the shoulder portion of a pedestrian may be applied, but any of the above is a known technique, and therefore, the detailed explanation thereabout is omitted here.

As a result of the processing performed with this head portion detection unit 33, the pedestrian head portion pattern detection result performed with the process of pattern matching is output as a head portion detection result (second position information) D2 [m].

[Leg Portion Detection Position Interpolation Unit]

The leg portion of the pedestrian greatly changes it shape, and therefore, the detection performed with the process of pattern matching may be interrupted, but the head portion of the pedestrian changes its shape less greatly, and therefore, detection performed with the process of pattern matching and the like may be less likely to be interrupted. Therefore, the leg portion detection position interpolation unit 34 uses the detection result D2 [m] which is output from the head portion detection unit 33 to calculate interpolation information interpolating the detection result D1 [n] which is output from the leg portion detection unit 32 (current position interpolation processing and past position interpolation processing), and interpolates the current value and the past value of the detection result D1 [n].

A processing content of the interpolation processing performed with the leg portion detection position interpolation unit 34 is substantially the same as the processing content explained with reference to FIG. 10 to FIG. 13 in the first detection position interpolation unit 14 according to the first embodiment explained above. However, the calculation method in step S1411 as illustrated in FIG. 11 cannot be applied to the determination method for determining the degree of consistency of the head portion detection result D2 [m] and the leg portion detection result D1 [n], and therefore, hereinafter, only the determination method for determining the degree of consistency performed with the leg portion detection position interpolation unit 34 will be explained.

Where the rectangle information about the leg portion detection result D1 [n] and the head portion detection result D2 [m] are denoted as (SX1, SY1, EX1, EY1), (SX2, SY2, EX2, EY2), respectively, first, the leg portion detection position interpolation unit 34 calculates the size of the head portion of the pedestrian: H=EY2−SY2, and calculates X-coordinate middle points of the leg portion detection result D1 [n] and the head portion detection result D2 [m]: CX1=(SX1+EX1)/2, CX2=(SX2+EX2)/2, respectively. Then, a determination is made as to whether the leg portion detection result D1 [n] and the head portion detection result D2 [m] are the same object (i.e., the same pedestrian) on the basis of conditions (a) to (c) as illustrated in the following expression (7).

[Expression 7]

(a): EY2>SY1

(b): $TH\_H\text{MIN} < (EY1-SY2)/H < TH\_H\text{MAX}$ (c): $|CX1-CX2| < TH\_dCX$ \hfill (7)

In this case, the condition (a) as shown in the expression (7) is a condition that the head is above the feet. The condition (2) is a condition that the ratio of the size of the height with respect to the face (heads high) is not too short and not too large. The condition (3) is a condition that the head and the feet are arranged substantially in the vertical direction. When all of the above conditions are satisfied, the leg portion detection position interpolation unit 34 determines that the leg portion detection result D1 [n] and the head portion detection result D2 [m] are of the same object (i.e., the same pedestrian).

[Actions and Effects of Third Embodiment]

As explained above, according to the vehicle surroundings recognition apparatus 30 of the third embodiment, the head portion detection unit 33 and the leg portion detection unit 32 detect, from the image, the head portion which changes less greatly on the image in the body of the pedestrian and the leg portion required for the measurement of the relative distance and the relative speed with respect to the pedestrian. The leg portion of the pedestrian greatly changes its shape, and therefore, the detection performed with the process of pattern matching may be interrupted, but the head portion of the pedestrian changes its shape less greatly, and therefore, the detection performed with the process of pattern matching may be less likely to be interrupted, and is detected at all times with the head portion detection unit 33. Therefore, the current value and the past value of the leg portion detection result (first position information) detected by the leg portion detection unit 32 (position information about the object (pedestrian leg portion) not detected with the leg portion detection unit 32) can be interpolated by using the head portion detection result (second position information) detected with the head portion detection unit 33, and therefore, the calculation accuracy of the relative position and the relative speed between the driver's vehicle and the pedestrian can be enhanced.

In the vehicle surroundings recognition apparatus 30 according to the third embodiment, the same detection technique (process of pattern matching) can be applied to the head portion detection unit 33 and the leg portion detection unit 32, and therefore, there is an advantage in that the apparatus configuration of the vehicle surroundings recognition apparatus 30 can be simplified.

In the first to third embodiments, the following aspect has been explained: in a case where the object serving as the detection target is detected with only the second detection unit 13 and the head portion detection unit 33, the relative distance and the relative speed with respect to the object (pedestrian) are not calculated, and in a case where the object serving as the detection target is detected with the first detection unit 12 and the leg portion detection unit 32, the relative distance and the relative speed with respect to the object (pedestrian) are calculated on the basis of the detection result, and the calculation result is output to an external device. However, in a case where the object serving as the detection target is detected with only the second detection unit 13 and the head portion detection unit 33, the relative distance and the relative speed with respect to the object (pedestrian) may be calculated on the basis of the detection result of the second detection unit 13 and the head portion detection unit 33. However, in that case, the relative distance and the relative speed with respect to the object (pedestrian) may be calculated by preferentially using the detection result detected with the first detection unit 12 and the leg portion detection unit 32. More specifically, in a case where the position information about the object serving as the detection target is detected with the second detection unit 13 and the head portion detection unit 33, and the position information about the object serving as the detection target is not detected with the first detection unit 12 and the leg portion detection unit 32 before and after that, the relative distance and the relative speed with respect to the object (pedestrian) is preferably measured on the basis of the detection result detected with the second detection unit 13 and the head portion detection unit 33, and the measurement result thereof is preferably output to an external device.

It should be noted that the present invention is not limited to the embodiments explained above, and includes various modifications. For example, the embodiment is explained in details in order to explain the present invention so as to make it easier to be understood, but the present invention is not necessarily limited to the configuration having all the elements explained above. Some of the elements of any given embodiment can be replaced with elements of other embodiments, and elements of another embodiment can be added to elements of any given embodiment. Some of the elements of an embodiment may be added, deleted, or replaced with other elements.

The control lines and information lines illustrated only where they are considered to be necessary in terms of explanation. Not all the control lines and information lines required in terms of a product are necessarily illustrated. In reality, it may be understood that substantially all the elements are connected with each other.

REFERENCE SIGNS LIST

10, 20, 30 vehicle surroundings recognition apparatus
1 camera
11 image acquisition unit
12 first detection unit
13 second detection unit
14 first detection position interpolation unit
15 distance measurement unit
16 output unit
26 output selection unit
32 leg portion detection unit
33 head portion detection unit
34 leg portion detection position interpolation unit

The invention claimed is:

1. A vehicle surroundings recognition apparatus recognizing a distance to a pedestrian appearing in an image obtained by performing image-capturing around a vehicle, the apparatus comprising:
   a first detection unit detecting first position information about the pedestrian in the image;
   a second detection unit detecting second position information about a moving object in the image in accordance with a technique different from the first detection unit;
   a first detection position interpolation unit performing identical object association on the basis of the first position information about the pedestrian detected by the first detection unit and the second position information about the moving object detected by the second detection unit, and in a case where a first state in which the first position information and the second position information as the same object are detected and a second state in which the second position information about the moving object is detected with only the second detection unit occur in a time sequence, the first detection position interpolation unit calculating first position information interpolation information for interpolating the first position information about the pedestrian in the second state on the basis of a relative position of the first position information about the pedestrian with respect to the second position information about the moving object in the first state; and a distance measurement unit measuring a distance to the pedestrian on the basis of the first position information and the first position information interpolation information.

2. The vehicle surroundings recognition apparatus according to claim 1, wherein the first position information includes a ground contact coordinate in the image of the pedestrian.

3. The vehicle surroundings recognition apparatus according to claim 1, wherein in a case where the first state occurs after the second state occurs, the first detection position interpolation unit calculates first position information interpolation information for interpolating the first position information about the pedestrian in the second state on the basis of a relative position of the first position information about the pedestrian with respect to the second position information about the moving object in the first state, and the distance measurement unit uses the first position information interpolation information to calculate a distance to the pedestrian in the second state again.

4. The vehicle surroundings recognition apparatus according to claim 1, wherein in a case where the second state occurs after the first state occurs, the first detection position interpolation unit calculates first position information interpolation information for interpolating the first position information about the pedestrian in the second state on the basis of a relative position of the first position information about the pedestrian with respect to the second position information about the moving object in the first state, and the distance measurement unit uses the first position information interpolation information to measure a distance to the pedestrian in the second state again.

5. The vehicle surroundings recognition apparatus according to claim 1, wherein in a case where the second state occurs and where the first state and the second state do not occur in a time sequence, the distance measurement unit measures a distance to the pedestrian on the basis of the second position information.

6. The vehicle surroundings recognition apparatus according to claim 1, wherein the first detection unit uses a process of pattern matching to detect the first position information about the pedestrian in the image, and the second detection unit uses an optical flow to detect the second position information about the moving object in the image.

7. The vehicle surroundings recognition apparatus according to claim 6, wherein a first detection area in the image defined in the first detection unit is smaller than a second detection area in the image defined in the second detection unit.

8. The vehicle surroundings recognition apparatus according to claim 1, wherein the first detection unit uses a process of pattern matching based on a leg portion shape of the pedestrian to detect the first position information about the pedestrian in the image, and the second detection unit uses a process of pattern matching based on a head portion shape of the pedestrian to detect the second position information about the moving object in the image.

9. The vehicle surroundings recognition apparatus according to claim 1, wherein the vehicle surroundings recognition apparatus further includes a selection output unit selecting and outputting a distance to the pedestrian, for which the first detection unit and the second detection unit have detected the first position information and the second position information until then, from among the distances measured by the distance measurement unit.

* * * * *